US009681307B2

(12) United States Patent
Taher et al.

(10) Patent No.: US 9,681,307 B2
(45) Date of Patent: Jun. 13, 2017

(54) SYSTEM AND METHOD FOR DETERMINING AND SHARING SPECTRUM AVAILABILITY

(71) Applicants: Tanim Taher, Austin, TX (US); Dennis Roberson, Chicago, IL (US)

(72) Inventors: Tanim Taher, Austin, TX (US); Dennis Roberson, Chicago, IL (US)

(73) Assignee: Illinois Institute of Technology, Chicago, IL (US)

( * ) Notice: Subject to any disclaimer, the term of this patent is extended or adjusted under 35 U.S.C. 154(b) by 0 days.

(21) Appl. No.: 14/861,321

(22) Filed: Sep. 22, 2015

(65) Prior Publication Data

US 2016/0088486 A1 Mar. 24, 2016

Related U.S. Application Data

(60) Provisional application No. 62/053,560, filed on Sep. 22, 2014.

(51) Int. Cl.
| | |
|---|---|
| *H04W 16/10* | (2009.01) |
| *H04W 16/22* | (2009.01) |
| *H04W 72/10* | (2009.01) |
| *H04W 16/14* | (2009.01) |
| *H04W 72/08* | (2009.01) |
| *H04W 72/04* | (2009.01) |

(52) U.S. Cl.
CPC ......... *H04W 16/14* (2013.01); *H04W 72/085* (2013.01); *H04W 72/0453* (2013.01); *H04W 72/10* (2013.01)

(58) Field of Classification Search
CPC ... H04W 16/14; H04W 24/10; H04W 72/085; H04W 72/0453; H04W 72/10; H04W 72/06; H04W 16/22; H04W 24/16; H04W 24/18; H04W 72/04; H04W 72/0486; H04W 72/0493; H04W 72/1247; H04L 27/0006; H04L 5/0064; H04L 29/06523; H04L 67/32; G01R 23/16
See application file for complete search history.

(56) References Cited

U.S. PATENT DOCUMENTS

| | | | | |
|---|---|---|---|---|
| 8,654,719 | B2* | 2/2014 | Hamalainen | H04B 7/18563 370/329 |
| 2003/0021245 | A1* | 1/2003 | Haumonte et al. | 370/330 |
| 2008/0221951 | A1* | 9/2008 | Stanforth | G06Q 10/063 705/7.41 |
| 2010/0081449 | A1* | 4/2010 | Chaudhri | H04W 72/082 455/452.2 |
| 2010/0173586 | A1* | 7/2010 | McHenry | H04L 27/0006 455/62 |
| 2010/0266002 | A1* | 10/2010 | Du et al. | 375/224 |

(Continued)

*Primary Examiner* — Meless Zewdu
(74) *Attorney, Agent, or Firm* — Pauley Erickson & Kottis

(57) ABSTRACT

A method and apparatus for determining and sharing RF spectrum availability. The method includes automatically sensing and analyzing a spectrum to identify used and/or unused portions of the spectrum, and automatically communicating the used and/or unused portions of the spectrum to a spectrum owner or a spectrum user. The invention has particular use in automatically identifying and quantifying current spectrum users, automatically reporting the current spectrum users to a spectrum owner, and/or allocating unused spectrum portions to users.

21 Claims, 14 Drawing Sheets

(56) References Cited

U.S. PATENT DOCUMENTS

| | | | |
|---|---|---|---|
| 2011/0039579 A1* | 2/2011 | Karjalainen | 455/456.1 |
| 2013/0295948 A1* | 11/2013 | Ye | H04W 72/0453 455/452.1 |
| 2014/0038552 A1* | 2/2014 | Rinne | H04L 41/5029 455/406 |
| 2014/0162585 A1* | 6/2014 | Bose | H04W 16/14 455/404.1 |
| 2014/0171018 A1* | 6/2014 | Elrefaey | H04W 16/04 455/406 |
| 2014/0171136 A1* | 6/2014 | Elrefaey | H04W 28/16 455/509 |
| 2014/0226609 A1* | 8/2014 | Hooli | H04W 16/14 370/329 |
| 2014/0274103 A1* | 9/2014 | Steer et al. | 455/454 |
| 2014/0328311 A1* | 11/2014 | Qiang | H04W 16/14 370/329 |
| 2015/0043471 A1* | 2/2015 | Rinne | H04L 5/0053 370/329 |
| 2015/0230255 A1* | 8/2015 | Lopes | H04W 16/02 370/329 |
| 2015/0281971 A1* | 10/2015 | Mueck | H04W 16/14 455/454 |
| 2015/0304852 A1* | 10/2015 | El-Refaey | H04W 16/14 455/509 |
| 2016/0249228 A1* | 8/2016 | Zhao | H04W 4/24 |

* cited by examiner

SYSTEM AND METHOD FOR DETERMINING AND SHARING SPECTRUM AVAILABILITY

CROSS REFERENCE TO RELATED APPLICATION

This application claims the benefit of U.S. Provisional patent application, Ser. No. 62/053,560, filed on 22 Sep. 2014. The Provisional application is hereby incorporated by reference herein in its entirety and is made a part hereof, including but not limited to those portions which specifically appear hereinafter.

GOVERNMENT LICENSE RIGHTS

This invention was made with government support under EARS Award No. 1248000 and EAGER CNS Award No. 1265351 awarded by the National Science Foundation. The government has certain rights in the invention.

FIELD OF THE INVENTION

This invention is directed to RF spectrum sharing and, more particularly, to a method and apparatus for determining spectrum availability for use by additional users.

BACKGROUND OF THE INVENTION

The need for increased RF spectrum access for wireless broadband applications continues within the commercial and government user domains. Since the usable RF spectrum is fully allocated, the only options available are to: a) increase the efficiency of current spectrum uses; b) re-purpose spectrum to higher value uses; or c) institute spectrum sharing. While the FCC has a database of authorized, licensed spectrum users, the ultimate success of any of these options depends on knowledge of actual RF spectrum utilization in time, frequency, and space. Studies have shown that although the spectrum is fully allocated, the actual occupancy at a given time and place may be low, which is indicative of low spectral efficiency.

There is a need to obtain mappings and models of the temporal and spatial variations of the RF environment with sufficiently high fidelity to estimate, characterize, and model spectrum utilization, actual multi-site RF measurements. With the infrastructure to collect and access spectrum data in place, it is necessary to 1) provide new methods for analyzing, modeling, and visualizing the resulting large, multi-dimensional information base; and 2) model spectrum activity to test the feasibility of spectrum sharing in candidate bands in order to facilitate decision-making and innovation in spectrum repurposing and sharing. To facilitate both of these analysis goals in any specific band, the entire list of signals and holes needs to be extracted and modeled. The frequency allocations of some of the signals are sometimes stored in a repository, such as the TV white space spectrum database. For such signals, the analysis of measured spectrum data is easier. However, this is frequently not the case, especially when it comes to analyzing wideband measurements that can span multiple frequency bands. In a majority of cases, the positions of the signals are not known by the spectrum sensor and the frequency locations of the signals and holes themselves need to be extracted first.

SUMMARY OF THE INVENTION

The invention provides a method and apparatus or system for determining spectrum use and/or spectrum sharing.

The invention includes a method of determining and/or sharing spectrum availability. Embodiments of the method include automatically sensing and analyzing a spectrum to identify used and/or unused portions of the spectrum, and automatically communicating the used and/or unused portions of the spectrum to a spectrum owner or a spectrum user. The invention has particular use in automatically identifying current spectrum users and automatically reporting the current spectrum users to a spectrum owner.

The invention further allows for ranking used and/or unused spectrum, ranking or prioritizing users and/or potential users, and matching the ranked unused portions of the spectrum to the potential users as a function of the prioritization. The invention allows for automatically sharing and prioritizing spectrum among current tiered spectrum users, and further allows for creating an N-tiered prioritization of users and potential users, thereby expanding the current, typically three-tiered user system.

The invention further includes a method of determining and/or sharing spectrum availability by automatically scanning a spectrum to identify unused portions of the spectrum, and automatically communicating the unused portions of the spectrum to potential users, or a transmission controller or smart radio thereof, for the spectrum. The scanning apparatus or system of this invention can receive spectrum requests from the potential users and automatically allocate the unused portions to at least one of the potential users as a function of the spectrum requests, availability, and/or prioritization. In embodiments of this invention, the method includes automatically ranking the unused portions of the spectrum; prioritizing the potential users for the spectrum; and automatically matching the ranked unused portions of the spectrum to the potential users as a function of the prioritizing. The prioritizing of the potential users also allows for an N-tiered hierarchical ranking, with the number of tiers being established, and subject to change, according to need.

In embodiments of this invention, the unused spectrum portions are identified as 'holes' in the spectrum. The method can include automatically analyzing the spectrum to identify hole information, and automatically communicating the hole information to at least one of the potential users. The transmission controllers or smart radios of users can select channel transmission parameters from the communicated hole information. Exemplary hole information includes, without limitation, a hole center frequency, a hole bandwidth, a vector of average power spectrum densities across frequency points in the hole, a vector containing a histogram of average power spectrum densities observed in the hole over time, a vector storing a calculated spectrum opportunity fraction versus secondary user bandwidth for the hole, or combinations thereof. In one embodiment of the invention, the unused portions of, or holes in, the spectrum are subdivided into a plurality of sub-channels each for one of the potential users.

Embodiments of the invention include two elements referred to herein as the Signal Descriptor Objects (SDO) and Hole Descriptor Objects (HDO). The invention further includes a method and a system including a combination of sensing devices, algorithms, the SDO/HDO, and/or a means to communicate the HDOs to a network of spectrum users, such as radios and/or radio control infrastructure that can dynamically share the spectrum. In one embodiment, the system includes one or more spectrum sensors along with an associated processor and computer storage medium and/or database elements. The method and system include a processor implemented, automated method referred to herein as Comprehensive Band Modeling (CBM) that analyzes a sensed spectrum to identify signals and white spaces (holes) in the spectrum. The method further determines the SDO/HDO objects containing the summarized results of this analysis, and communicates the HDOs to secondary spectrum users (either directly or through a control infrastructure) so that the secondary users can share the unused white spaces to wirelessly transmit. Embodiments of this invention provides a new use for spectrum observatory (SO) systems, through the application of such SO systems to support dynamic spectrum sharing between primary and secondary radio users, and to provide additional tiers of users.

In one embodiment, the automated CBM method of this invention analyzes incoming live or historically archived spectrum measurement matrices to identify the frequency locations where primary incumbent signals exist and where holes, i.e., the spectral white spaces, lie. The CBM can encompass one or more of numerous automatically implemented algorithms and/or techniques including, but not limited to: (i) noise floor estimation; (ii) extraction of individual transmissions of signals or individual time sweeps containing holes and clustering these data points; (iii) extracting the frequency and bandwidth information about all the signals and holes; (iv) analyzing the holes specifically to determine the spectrum opportunity in the hole and expected interference levels from the primary user; (v) identification of the optimal secondary user frequency in each hole; (vi) extracting set of time series' of incumbent user activities in different frequency points within the hole; (vii) compactly modeling the dynamic behavior of incumbent user transmissions within each time series; and/or (viii) creating the SDO/HDO objects that summarize all the above information in a compact usable form.

Spectrum data can be very large, such as currently expanding to hundreds of megabytes or even gigabytes of storage. As such, the raw information is not very applicable in practical wireless networks. The HDO objects provided by this invention are more compact, such as only kilobytes in size. The HDO objects contain all the useful and applicable information necessary for any smart radio device (primary or secondary) to select transmission parameters like frequency of operation and bandwidth, so that it can efficiently operate. In embodiments of this invention, the HDO can include or store, for example, the following properties related to information about the full spectrum hole: (i) hole center frequency; (ii); hole bandwidth; (iii) vector of average power spectrum densities across the frequency points in the hole; (iv) vector containing the histogram of average power spectrum densities (PSD) observed in the hole over time; and/or (v) a vector storing a calculated spectrum opportunity fraction (SOF) versus secondary user (SU) bandwidth for the hole. The properties i-v are applicable for the entire hole bandwidth. However, the hole can be subdivided into multiple sub-channels where SUs can operate. Another set of properties generally apply only to a single sub-channel with center $f_{SU}$: (vi) the sub-channel frequency within the hole that the SU can utilize; (vii) the sub-channel bandwidth; (viii) average incumbent occupancy observed from the extracted time series; (ix) time window length used in modeling the time series of incumbent primary user (PU) activity; (x) model type used to approximate incumbent activity; (xi) probability density functions for the distributions used for each of the PU transmission states related to the corresponding model (lognormal/exponential/gamma/etc.); and/or (xii) vectors for each of the time-varying parameters related to each of the state distributions. The HDO can include additional properties, depending on need.

The HDO allows for methods that can be automatically executed by the SU to output relevant information. The methods include, but are not limited to: (i) a method calculating the expected PU interference on the sub-channel used by SU from the average PSD vector; (ii) a method estimating the average PU occupancy from the PU model parameters; and/or (iii) synthetic PU traffic generator methods (one for each model). The HDO can allow for additional methods, depending on need.

Analogous to HDO, SDO objects also contain summary information about the signals identified by the CBM procedure. In embodiments of this invention, the SDO can include or store, for example, the following properties related to information about the identified signals: (i) signal center frequency; (ii); signal bandwidth; (iii) vector of average power spectrum densities across the frequency points in the signal; (iv) vector containing the histogram of average PSD observed in the signal over time; (v) time window length used in modeling the time series of signal activity; (vi) model type used to approximate incumbent activity; (vii) probability density functions for the distributions used for each of the states of the corresponding model (lognormal/exponential/gamma/etc.); and/or (viii) vectors for each of the time-varying parameters related to each of the state distributions. The SDO can include additional properties, depending on need.

The SDO allows for methods that can be executed to output relevant information. The methods include, but are not limited to: (i) a method estimating average PU occupancy from the PU model parameters; and/or (ii) synthetic PU traffic generator methods (one for each model). The SDO can allow for additional methods, depending on need.

The SDO and HDO objects are communicated to a network of smart radios or an appropriate wireless control infrastructure that use(s) the summarized information to select channel transmission parameters to ensure smooth extended operation with minimal interference and maximum bandwidth. The communication methods include but are not limited to: (i) secure broadcast in a wireless control channel; (ii) uploaded to an online database from where the smart radios can download the SDO and HDO objects; and/or (iii) physically copying the SDO/HDO objects in digital media like flash drives, CDs, etc.

The apparatus or system for implementing the method of this invention includes a spectrum scanner including a data processor for executing machine-readable coded instructions for determining spectrum holes and hole information, a recordable medium storing the coded instructions and/or spectrum information, and a communication module, such as a wireless or network connection to a transmission controller or other equipment of a spectrum user. As will be appreciated, system components will vary depending on need.

DESCRIPTION OF EMBODIMENTS OF THE INVENTION

Figure 1:
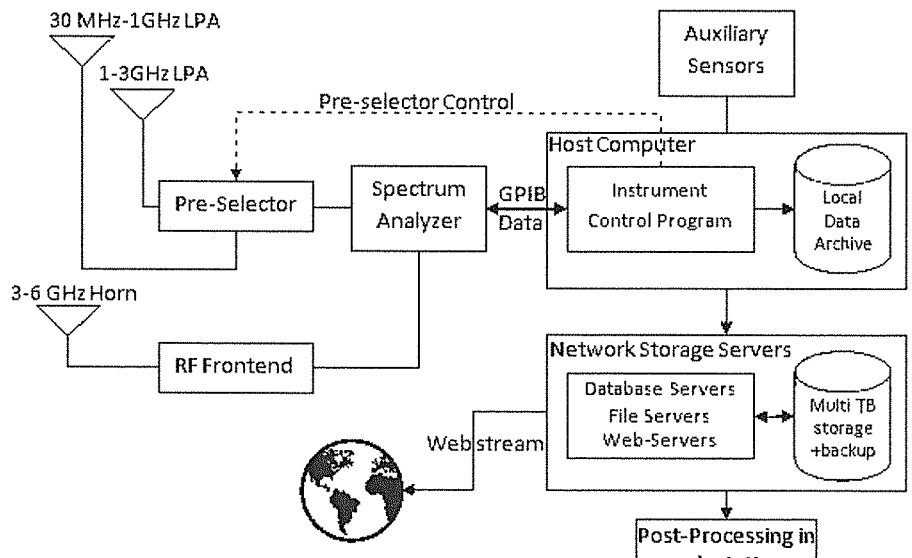
FIG. 1 illustrates major components of a spectrum observatory (SO) data acquisition system, according to one embodiment of this invention.

If a secondary or other lower tier cognitive radio user (SU) aims to make shared-use of the spectrum, its spectrum sensor needs adequate knowledge of the primary or higher tier user (PU) signal frequencies that the SU must avoid, and also the spectrum holes which it can use. The duty cycle of a PU signal can vary—hence the signal may not be identified from short time measurements, especially if its duty cycle is low. This makes the functioning of a secondary spectrum user difficult. First, the SU may not have a priori knowledge of the primary user frequencies and the spectrum holes. Second, even if the SU attempts to estimate the PU frequency locations, it may not be able to detect low duty cycle primaries during its short sensing phase. A continuously running spectrum observatory (SO), however, can detect and build up a list of all the primary user transmissions in a band over time. It can also extract a list of opportune spectrum holes. Thus a spectrum observatory can serve as a facilitator for a network of SUs, thus driving the paradigms of dynamic spectrum sharing. In such an application, the long-term data collected by the SO needs to be continually analyzed to extract the list of frequencies that correspond to signals or holes in a band of interest. This invention provides a method and system for efficient automated list extraction, especially for situation where the signal frequencies may not be known initially.

Embodiments of this invention provide Signal/Hole descriptor object (SDO/HDO) elements that summarize useful information and traffic models about signals and holes detected in the spectrum. The SDO and/or HDO summarize gigabytes of raw spectrum measurements in a usable compact format that can be directly used by practical smart radios or other potential spectrum user equipment to operate. Current smart radios, for example, in the TV white spaces cannot share the spectrum dynamically. Rather, they have to log into a static database (like Google's spectrum database) that lists the TV channels in that geography that are unused. For dynamic spectrum access, it is necessary to measure and dynamically model white space holes and communicate this information compactly to secondary users.

The invention includes a spectrum modeling method to provide the SDO/HDO. The modeling method automatically identifies all holes and signals. The modeling method is flexible, in that it can be applied on multiple different spectral bands, where measurements were obtained using multiple different spectrum sensors, and provide good results. The invention outputs detailed models about the activities of signals and incumbent radios that are present.

This invention includes a method of modeling spectrum bands, referred to herein as comprehensive band modeling (CBM). In some embodiments, the CBM model is describable by a tiered structure, where the first tier identifies the holes and signals; the second tier ranks the holes in terms of available bandwidth and incumbent duty cycle; and the third tier models the infrequent incumbent transmissions. With the three tiers of information, a secondary user can readily identify all the suitable DSA channels within the entire spectrum band.

In embodiments of this invention, CBM automatically extracts all the signals and holes in a band from SO data, or equivalent data, without a priori information. Statistics of wireless traffic activity in each signal/hole frequency in the list is extracted. In one embodiment, for the band's frequencies classified as holes, CBM ranks the holes by quantifying the DSA opportunity, and also models the infrequent PU traffic within a hole. The extracted information is compact and tractable compared to the many gigabytes of raw SO data. The CBM procedure is readily implementable in a DSA architecture, where an SO supports a network of SU cognitive radios by relaying information about PU signals and spectrum holes in the band of operation by the use of "data objects". The SU radios would be able to efficiently utilize the frequency band with minimal interference from PUs.

As used herein, an SO (spectrum observatory) includes one or more spectrum power sensors that are connected to one or more antennas, amplifiers, RF pre-selectors, and/or additional sensors, such as GPS. At regular intervals (in the order of seconds or minutes), the spectrum sensor measures and stores RF powers in a computerized database or file format.

As one SO example, the WiNCom research center at Illinois Institute of Technology (IIT) has implemented several separate kinds of SOs, each consisting of a different spectrum sensor. The IIT Spectrum Observatory has been monitoring the 30-6000 MHz radio activity of the city of Chicago since July 2007 from its location at the top of the 21 story IIT Tower on IIT's main campus on the south side of Chicago. This building is located 5.3 km south of the Willis Tower and has the advantage of an unobstructed view of downtown Chicago from its roof, where the SO antennas are situated. The major components of the base SO data acquisition system are shown in FIG. 1 and include: a Rohde & Schwarz FSP-38 spectrum analyzer, a custom pre-selector/RF frontend with independently selectable bands, three directional antennas (two log-periodic and a microwave horn), a data processor such as a desktop computer and various auxiliary sensors (e.g., a weather station and a GPS receiver). This is WiNCom's first and longest running spectrum observatory, and is referred to as the IITSO. More details of the setup can be found in Bacchus et al., "Long-Term, Wide-Band Spectral Monitoring in Support of Dynamic Spectrum Access Networks at the IIT Spectrum Observatory," New Frontiers in Dynamic Spectrum Access Networks, DySPAN 2008. 3rd IEEE Symposium pp. 1-10, 14-17 Oct. 2008, herein incorporated by reference.

Figure 2:
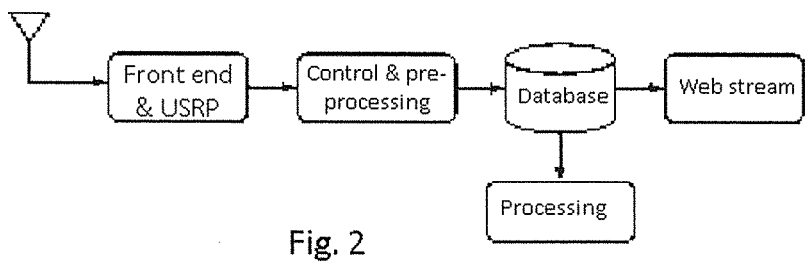
FIG. 2 illustrates an RF data acquisition and storage system according to one embodiment of this invention.

A RF data acquisition and storage system was implemented to measure voice channels in the 450 MHz LMR band, as illustrated in FIG. 2. The system consists of an omni-directional discone antenna set up on the roof of the IIT tower. The antenna is connected to a 450-474 MHz bandpass filter, and then to a USRP N200 software radio platform with a wideband frontend. During each measurement sweep, the USRP captures time-domain samples which are then used to estimate the Power Spectrum via Fast Fourier Transform (FFT). From the power spectrum, the power within every 12.5 kHz LMR channel span is found by integration. These power values are then stored in a database and also web-streamed live in real-time. A more detailed description of the system is found in Taher et al., "Empirical modeling of public safety voice traffic in the land mobile radio band," Cognitive Radio Oriented Wireless Networks and Communications (CROWNCOM), 2012 7th International ICST Conference, pp. 230-235, 18-20 Jun. 2012, herein incorporated by reference.

The spectrum occupancy measurement setup consists of a CRFS RFeye receiving system, data storage, and data transfer equipment. The RFeye receiver is a dedicated FFT-based spectrum analyzer that has the following technical specifications: frequency range 10 MHz to 6 GHz, fast digital sweep with maximum of 20 MHz bandwidth (BW), resolution bandwidth (RBW) selectable between 0.073-1200 kHz, four RF inputs, rugged compact outdoor environment construction and Global Positioning System (GPS) support. It is able to send the measured data via Ethernet to a centralized database. A broadband omni-directional and multi-polarized antenna covering the 85-6000 MHz frequency range is used. The whole band is divided into multiple sub-bands and is continuously monitored with a selected set of parameters.

In Chicago, the selected location of the primary RFeye-based spectrum observatory is on the top of the same 21 story building on the IIT campus. A second RFeye spectrum observation system has been set up at a height of 168 meters on the roof of the 54 story Harbor Point building located at the eastern edge of downtown Chicago near Lake Michigan.

Figure 3:
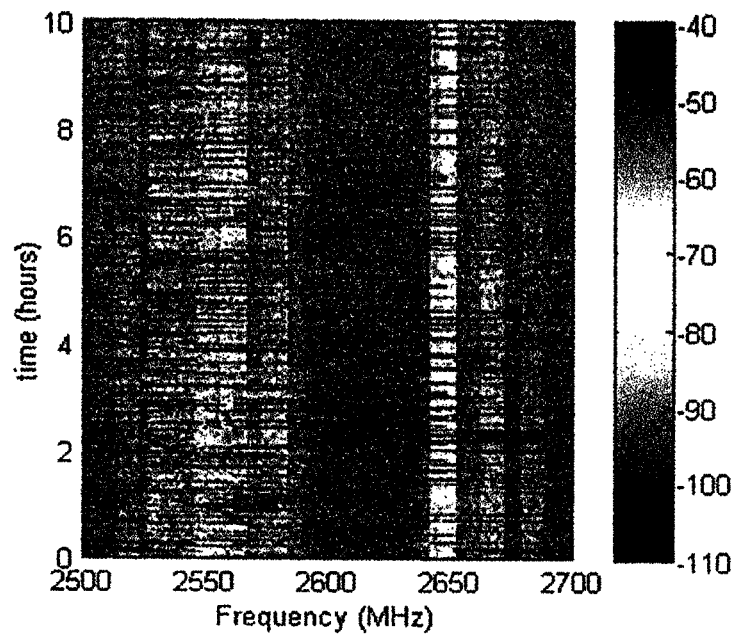
FIG. 3 is a spectrogram plotted according to one embodiment of this invention.

Spectrum data collected by an SO is retrieved from the measurement database in a 2-dimensional matrix format, where one axis corresponds to the frequency and the other to the timestamps of sensing instants, and each value within the matrix is a power measurement. The matrix is conveniently plotted via a spectrogram, such as shown in FIG. 3. The overall objective of the CBM is to extract the frequency locations of the signals and holes from this matrix, and to model the on-off traffic activity.

In one embodiment of the invention, a first step is to estimate a noise floor so that a simple energy detection algorithm can be used to threshold the matrix of powers into a binary matrix. A simple option is to select a fixed threshold for all frequency bands, but the problem is that the noise floor in SO data varies from band to band. This is due to a number of factors. In some bands, large attenuation may be necessary at the SO's RF frontend due to the presence of strong signals (e.g. FM radio, TV) and this raises the noise floor. In other bands there may be no attenuation needed. The resolution bandwidth for measurements can vary from one band to the next depending on the band's spectral use characteristics and measurement parameters. Finally, leakage from strong signals raises the noise floor on adjacent channel frequencies. Thus, the noise floor needs to be adaptively and automatically estimated band by band across the wideband frequencies measured. The noise floor can be estimated from the average or max-hold power spectrum plots.

In embodiment of this invention, an automatic noise floor estimation algorithm can be applied in the CBM procedure, such as based on Ready et al., "Automatic noise floor spectrum estimation in the presence of signals," Signals, Systems & Computers, Conference Record of the Thirty-First Asilomar Conference, vol. 1, pp. 877, 881, November 1997, and uses morphological image processing techniques to iteratively estimate the noise floor starting from a power spectrum plot. The procedure was chosen as it gives good results across very wide bandwidths of signal measurements (tested from 30-6000 MHz), even when the spectrum sensor has non-flat frequency response and noise. At start, the power spectrum plot is converted to a binary 2-D image where the x-axis is the same frequency axis as in the original plot, but the y-axis represents a dBm power scale. The y-axis is spaced discretely in steps of 0.25 dB, and ranges from the minimum measured power level of the power spectrum plot to a maximum allowed noise estimate level (−80 dBm used here). At a specific x-axis column, that is, at a specific frequency value, the binary image pixels have value '1' at the y-axis power levels that are lesser than the power spectrum value at that frequency, and '0' otherwise. This binary image (shown in FIG. 4) is then processed by a rectangular kernel of size k, first with the erosion operator and then a dilation operator. In image processing terminology, the erosion and dilation operations combined constitute an image "opening" function. The opening operation is iteratively repeated, where the kernel size k is incremented by 1 each time. Convergence is achieved when the mean squared error between two consecutive binary image iterations is less than a pre-defined value. After convergence, the final 2-D binary image is converted back to a spectrum plot in a manner complementary to the procedure mentioned above. This plot is the noise floor estimate. Once the noise floor has been estimated, a threshold value several dBs above the noise estimate is applied to the spectrum data matrix.

Figure 4:
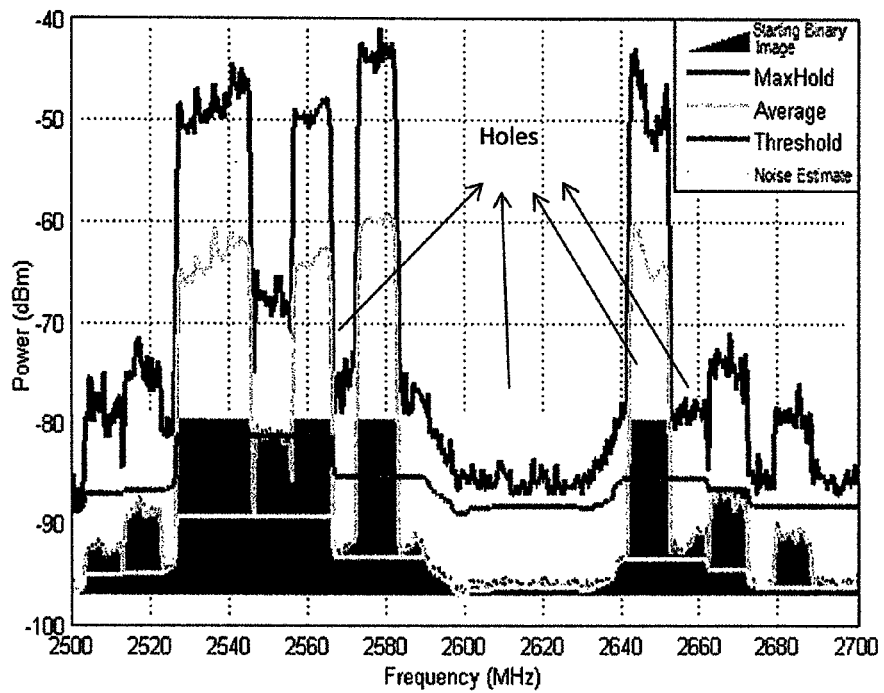
FIG. 4 is a binary image created according to one embodiment of this invention.

FIG. 4 illustrates the results of the application of the algorithm, where the spectrum data in the 2.5-2.7 GHz band was used. The RFeye spectrum sensor was used for the measurements. In FIG. 4, the starting binary image, colored grey (0) and black (1) that was input to the noise floor estimation algorithm is super-imposed behind the max-hold and average power spectrum plots, and the noise floor estimate and threshold plots. Notice, the estimated noise floor tracks the lowest points of the average power spectrum plot closely. A threshold setting of 8 dBs was used above the estimated noise floor. This was because the measured noise is sometimes found to be higher than the average; for example, during some measurement instances when the RFeye's automatic gain control (AGC) block selects high attenuation due to the presence of high powered signals. Custom band-reject filters to attenuate the specific frequency locations of the high powered signals help alleviate the AGC issue, but were not in place for measurements shown in this paper.

A second step in CBM extracts the cluster of all detected transmissions, and also extracts the cluster of spectrum holes within the two-dimensional spectrum data matrix. A simple method to do this is to threshold the average or MaxHold power spectrum chart, find the frequency points where the power spectrum is above the threshold and label them as signals, and label the regions below the threshold as holes. While this may work in some bands, it will not work in others where signals are situated very close together and cannot be resolved; where the holes and signals overlap, for example, if the PU has a very low duty cycle; and in multi-use bands where multiple signals could overlap with each other. Hence, it is necessary to use the power variations within both the time and frequency domains to properly resolve all the signals and holes.

In one embodiment, starting with the 2-D SO data matrix, each sweep of measurements is sequentially extracted as a vector, and then analyzed as follows. First, the vector of power values is thresholded with the several dB offset above the noise floor estimate. The zero crossings of the resulting binary vector are extracted using the first derivative of this binary vector. For that single sweep, the signal starts are the frequency points where the first derivative of the binary power spectrum vector is positive, and the signal stops are the frequency points where the derivative is negative. In between the signal gaps are the hole locations, where the hole start and stop frequency points are found in similar fashion. For each signal/hole, the integrated power, the center frequency, and the bandwidth values are recorded as a data point. Additional information can also be recorded, for example, the time information.

After analyzing all the sweeps in the data matrix, a set of data points of signals and an alternate set of hole data points are obtained. If the set of data points of signals are plotted in 3-dimensional (center frequency, power, and bandwidth) space, the points appear clustered in several regions in the frequency domain—this corresponds to the frequency centers of the signals. Similar clustering is seen in the sets of hole data. From these clusters, all the signals/holes can be resolved and classified after extraction.

Figure 5:
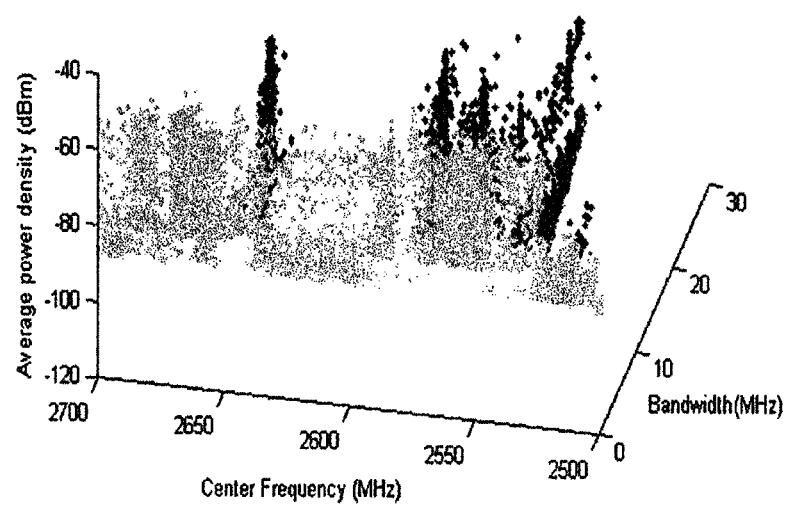
FIG. 5 is a three dimensional plot of clusters of data points representing holes and signals extracted from the 2.5-2.7 GHz band according to one embodiment of this invention.

FIG. 5 includes a 3D plot of the clusters of data points representing holes and signals extracted from the 2.5-2.7 GHz band. The holes are color coded as lighter shaded points, signals with bandwidth below 5 MHz as medium shaded, and signals above 5 MHz bandwidth are the darkest points. Note, that in the average power axis, the lightest shaded holes lie in a low power plane below the signals.

A next step is to identify all the signals and holes in the band by extracting their start and stop frequencies, and bandwidths. There are two preferred ways of doing this. A first method involves clustering the data points of signals and clusters extracted above, and then using an association algorithm twice—first to extract the signal frequency locations, and then to repeat this process for the holes. A second method starts off exactly in the same way, but once the association algorithm has identified the signal frequencies, the holes' locations are simply identified as the frequency points complementary to those of the signals.

In some embodiments, the Signal and Hole frequencies are identified in an analogous manner. This method is generally preferred for most bands, unless the signals in the band exhibit rapid on-off switching characteristics. The first step is to associate the data points in the cluster and identify the start and stop frequencies of the signals/holes. This is done by obtaining a histogram of start frequencies of the clustered points for signals/holes. For each of the data points, the start frequency is noted, and the start frequencies of all of the points are used to construct a probability distribution of signals'/holes' start frequencies, i.e., a histogram. For the frequency value where a signal/hole begins, there will be a localized peak in the histogram of start frequencies. Similarly, a histogram of stop frequencies is obtained from the data points extracted above, and localized peaks are seen in those frequency values where signals/holes end. A standard peak detection algorithm is applied to the histograms to obtain the frequency values of all the start/stop peaks of the signals/holes.

Once the histogram peaks for start and stop frequency values of signals/holes are obtained, a next step is to associate each start frequency peak with the corresponding stop frequency peak for the signal/hole. When the association is complete, all the signal and hole locations would be extracted, and then the data points from above can be classified as belonging to a particular signal/hole. Also, the full list of all signals/holes in the frequency band being studied would be obtained. The association method between histogram start and stop frequency peaks for one embodiment is done as described below.

First, out of all the start peaks of the signals/holes, n number of the peaks with the highest histogram values are selected and sorted in order of decreasing height. This insures that only the clearly discernable peaks are used for further analysis. The selection of $n_s$ (number of signals)/$n_h$ (number of holes) is one of the few processes in the entire CBM procedure that can be performed manually. Background knowledge about the band being studied is used to select $n_s$ and $n_h$. For example, if the band is expected to have 10 signals and 7 holes, then the researcher can manually set $n_s=10$ and $n_h=7$. It is also possible to automate this process by setting $n_s/n_h$ equal to the total number of prominent start peaks for signals/holes. However, better results were obtained by manually setting $n_s$ and $n_h$.

The simplest way of association is to connect each start frequencies' histogram peak with the closest higher frequency value stop histogram peak. In practice, this did not work well with the spectrum data. Part of the reason for this is that for OFDM wideband signals, some of the OFDM sub-carriers or pilots may be low power some of the time and below the detection threshold; this leads to two or more peaks in the histograms of stop frequencies for the same signal where the peaks are of different heights. If the simplistic peak association approach was used, the single OFDM signal would be erroneously classified as two or more separate signals by the algorithm. Thus it is necessary to go back to the data points' clusters obtained above and use additional information to robustly associate the start and stop peaks.

For each start peak, the subset of data points from above where the signal/hole begins at that particular peak is analyzed. For each point in this cluster, the stop frequency is found and if it is found to match with one of the stop frequencies' histogram peaks, then a score of +1 is given to the stop peak. At the end, the stop peak with the highest score is associated with that particular start peak. Even if an OFDM signal beginning at a start peak produces multiple stop peaks due to the lower powered sub-carriers, the true stop frequency of the wideband signal is likely to have the highest score. Hence the correct start and stop frequencies of the particular signal are more likely to be extracted. This is because, even if some of the sub-carriers are off during individual measurement sweeps, the OFDM signal always stops at that stop peak frequency that also corresponds to the highest OFDM sub-carrier. A similar analogous approach is used to obtain the start and stop frequencies of the holes. At the end of this algorithm step, the list of $n_s$ signals and $n_h$ holes within the entire band are obtained. Each signal/hole is identified with its start, stop, and center frequencies and its bandwidth.

Figure 6:
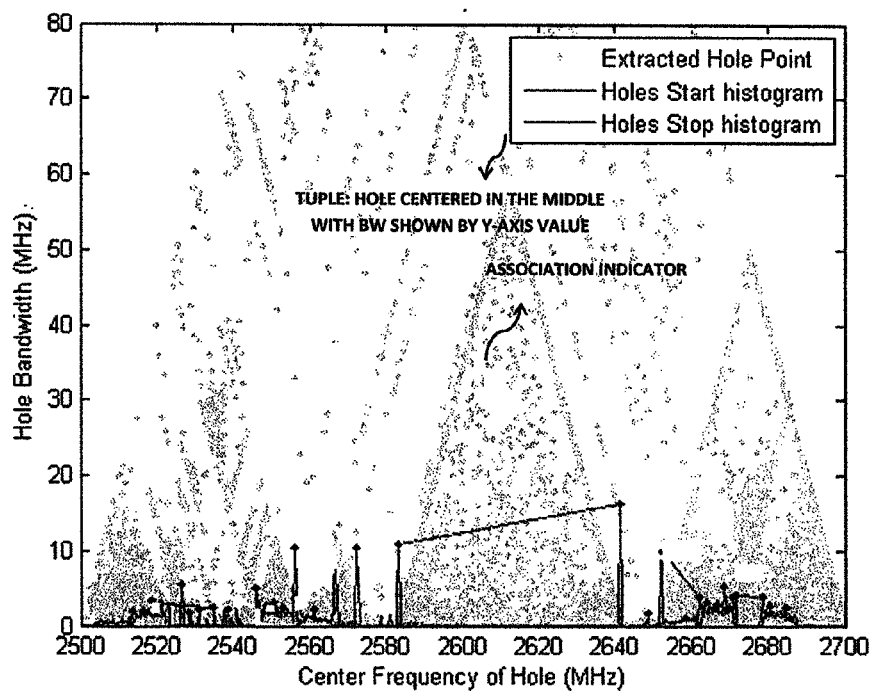
FIG. 6 is a histogram of start and stop frequencies for spectrum holes in the 2.5-2.7 GHz band according to one embodiment of this invention.

FIG. 6 shows the histogram of start and stop frequencies for the spectrum holes in the 2.5-2.7 GHz band from the Chicago data. To extract the holes' frequency information, the start and stop histogram peaks are associated by the algorithm described above. The center locations and the bandwidths of the main holes are shown via the rectangles in FIG. 6. Table 1 lists select four holes extracted from this band, where the ranking is done based on the peak heights observed in the histogram of hole start frequencies. Comparing the results of Table 1 with the power spectrum plot of FIG. 4, it is seen that the CBM procedure correctly identified the holes as situated within the distinct low power regions of the spectrum.

TABLE 1

List of Extracted Holes in 2.5-2.7 GHz band

| | Frequency Information about the Hole | | |
|---|---|---|---|
| Hole ID | Start (MHz) | Stop (MHz) | Bandwidth (MHz) |
| 1 | 2583.1 | 2641.2 | 58.4 |
| 2 | 2652.2 | 2661.9 | 10 |
| 3 | 2545.9 | 2546.6 | 0.9 |
| 4 | 2671.6 | 2678.4 | 7.2 |

In an additional or alternative method the Signal locations are identified first, with the holes lie at the complementary frequencies. This second method can be used when good results are not obtained by the first method, particularly, in bands where the signals switch on and off rapidly—for example, in the LMR 450-474 MHz band. The methods operate the same when it comes to extracting the list of signals' frequency and bandwidth information. However, in this method processing to begin extraction of holes does not begin until all the signals in the band have been extracted. Once all the signals are known, the discrete continuous stretches in the band's frequency axis that are not spanned by any of the signals are then identified as the individual holes. Thus, the list of frequency-spans, which are complementary to the signal locations, constitutes the list of holes. The holes' start, stop frequencies, and bandwidths are noted and output by this method.

This completes a first tier of one embodiment of the CBM procedure. The signal and hole frequencies within the band are now extracted and describable with five (5) sets of information: spectrum type (hole or signal), start frequency, stop frequency, center frequency, and bandwidth. It is now possible to classify all the data points from above as belonging to a particular signal/hole included in the extracted list. The next two tiers of the CBM can deal with those spectrum frequencies that have been classified as holes.

For DSA, the secondary access channel or hole should ideally have large enough bandwidth and have a low probability of interference from the primary user. In other words, the PU should have a low duty cycle. Conversely when this condition is met, the use of the channel by the secondary user would cause little interference to the PU. In this step, the holes are first ranked in order of decreasing bandwidth, and then further analyzed to calculate the expected PU interference on secondary operation. It is important to note that a hole identified by CBM above is not completely free of PU transmissions; rather, the hole identification is done because in the time domain, PU activity within the start and stop frequencies of the hole is low. That is, the spectrum opportunity of the hole exists only in those time slots when the PU is not transmitting.

Since a spectrum observatory collects measurements continuously for long periods of time, it is possible to retrieve the time series of radio activity within a frequency range of interest and then examine its suitability for DSA. Given the start and stop frequencies of a hole, the RF power measurements in each time sweep are integrated to obtain a time series of integrated power over time. The power values are thresholded to obtain a second binary time series of channel occupancy versus time. The threshold is calculated by integrating the same estimated noise threshold vector from above across the frequency values spanned by the hole. The average PU occupancy percentage in the hole is simply calculated as the mean of the binary time series.

Figure 7:
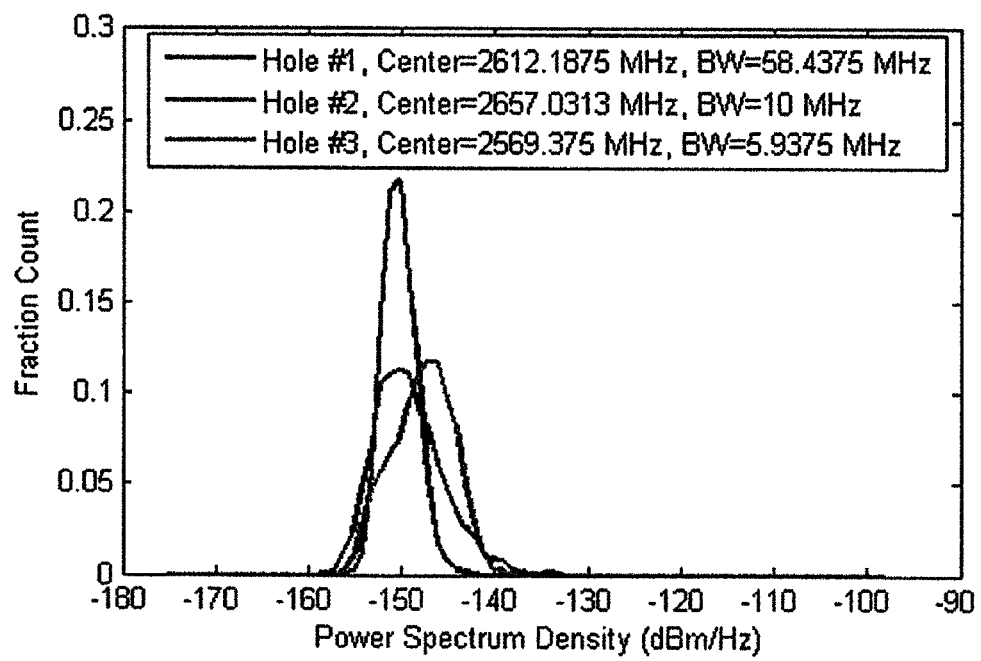
FIG. 7 includes histograms for the 2.5-2.7 GHz band according to one embodiment of this invention.

The time series of integrated powers within the hole can be further analyzed as follows. First, the integrated power is divided by the total hole-bandwidth to obtain a vector of instantaneous average power spectrum density (PSD) values in dBm/Hz as expected at any frequency point within the hole. Histograms of the PSD vectors for all the holes are then calculated and plotted to compare the power profiles of the holes. The histograms are shown in FIG. 7 for the 2.5-2.7 GHz band. A hole with good spectrum opportunity would have only one narrow peak in the PSD histogram at a low power level, whereas a hole with more than one peak or a wide single peak is indicative of PU activity within the hole.

The next step is to calculate the Spectrum Opportunity Fraction (SOF) that a SU with bandwidth, $W_{SU}$, will expect if it operated in a particular hole of bandwidth, $B_{hole}$. It is assumed that the SU is a smart cognitive radio that uses techniques like discontinuous orthogonal frequency division multiplexing (DOFDM) to permit it to operate with an aggregated $W_{SU}$ bandwidth even if the sub-carriers are not all in one block of continuous spectrum. To calculate the SOF, a sub-matrix is extracted from the SO data matrix, where the frequency dimension only spans the data points between the start and stop frequencies of the hole, but the time dimension spans all the time sweeps of the SO data matrix. Then using the sub-matrix's data for the i'th sweep at time $t_i$, the frequency points spanning $B_{hole}$ are thresholded with the noise estimate of above, and the bandwidth $B_{free}$ is calculated by summing the frequency point widths below the threshold. The fraction of available spectrum at time $t_i$ is simply calculated as $B_{free}/B_{hole}$.

Assuming $W_{SU}<B_{hole}$, for the i'th time sweep, a total of $(B_{hole}/W_{SU})$ instances of the SU could have simultaneously transmitted at $t_i$ if all the RF measurements were found to be below the threshold. In reality, one may only be able to accommodate $(B_{free}/W_{SU})$ simultaneous SU transmissions of $W_{SU}$ bandwidth at time $t_i$. The $SOF_i$ at time instant $t_i$ is simply the ratio of these two fractions, and is calculated as:

$$SOF_i = \begin{cases} 0, & \text{when } B_{free,i} < W_{SU} \text{ during } t_i \\ \frac{B_{free,i}/W_{SU}}{B_{hole}/W_{SU}}, & \text{when } B_{free,i} \geq W_{SU} \text{ during } t_i \end{cases} \quad (1)$$

$$= \begin{cases} 0, & \text{when } B_{free,i} < W_{SU} \\ \frac{B_{free,i}}{B_{hole}}, & \text{when } B_{free,i} \geq W_{SU} \end{cases},$$

The $SOF_i$, is zero if the unoccupied bandwidth ($B_{free,i}$) at time $t_i$ is less than the minimum required SU bandwidth ($W_{SU}$). The overall SOF is found by averaging $SOF_i$ over all n time sweeps using (2):

$$SOF = \frac{1}{n}\sum_{i=1}^{n} SOF_i. \quad (2)$$

Figure 8:
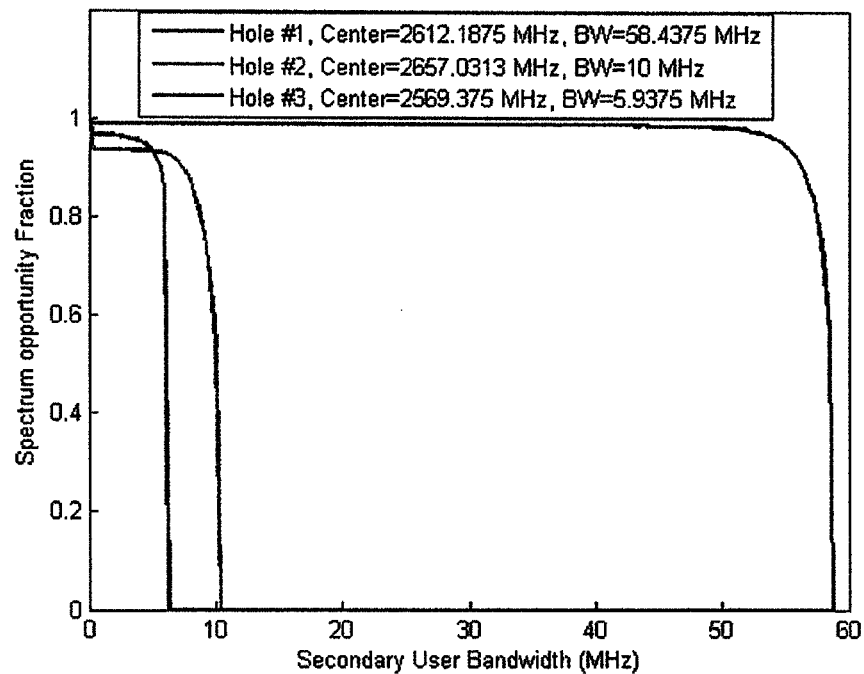
FIGS. 8 and 9 include plots for the 2.5-2.7 GHz band according to one embodiment of this invention.

The $W_{SU}$ parameter is then swept for a range of possible values representing SU's of different operational bandwidths, and a plot of SOF versus SU bandwidth is obtained. The SOF as a function of SU bandwidth calculated this way can be a more practical expression of the prospect of improving spectrum utilization in a band compared to the occupancy measure calculated from the binary time series as mentioned above, since it incorporates the bandwidth of the potential application as a parameter. Result plots are included in FIG. 8 for the 2.5-2.7 GHz band. The chart of SOF versus the SU bandwidth ($W_{SU}$) is a useful result as the SU can use it to decide what transmission bandwidth to use, and to get the probability of interference free operation for the chosen $W_{SU}$. Furthermore, the SU can readily compare SOF vs bandwidth charts for each of the extracted holes in the band, and select the hole that gives the highest SOF for the highest possible SU bandwidth of operation.

In one embodiment of the CBM, it is assumed that the SU operates in a contiguous block of spectrum unlike the DOFDM assumption used above. When the hole's bandwidth $B_{hole}$ is greater than the bandwidth $W_{SU}$ for the desired SU operation, the center frequency of transmission for the SU can take a range of values within the spectrum hole. There is a need to determine the optimal center frequency that gives the least level of predicted interference to the SU. This is done as follows.

The 2D sub-matrix of spectrum data with frequency span corresponding to the specific hole is averaged along the time axis over all measurement sweeps to obtain a vector of average power spectrum density. Then, an integration window with bandwidth $W_{SU}$ is swept across the hole, where at each integration point, the center of the window is sequentially incremented along the frequency span of the hole. For a hole with center frequency, $f_c$ and bandwidth, $B_{hole}$, the center frequency of the integration window, $f_{SU}$, is swept incrementally from $$\left(f_c - \frac{B_{hole}}{2} + \frac{W_{SU}}{2}\right) \text{ to } \left(f_c + \frac{B_{hole}}{2} - \frac{W_{SU}}{2}\right).$$

The boundary condition $$\left(\pm \frac{W_{SU}}{2}\right)$$

ensures that the edges of the SU transmission do not go beyond the frequency boundaries of the hole. This is shown by (3).

$$SOF_i = \begin{cases} 0, & \text{when } B_{free,i} < W_{SU} \text{ during } t_i \\ \frac{B_{free,i}/W_{SU}}{B_{hole}/W_{SU}}, & \text{when } B_{free,i} \geq W_{SU} \text{ during } t_i \end{cases} \quad (3)$$

$$= \begin{cases} 0, & \text{when } B_{free,i} < W_{SU} \\ \frac{B_{free,i}}{B_{hole}}, & \text{when } B_{free,i} \geq W_{SU} \end{cases},$$

Figure 9:
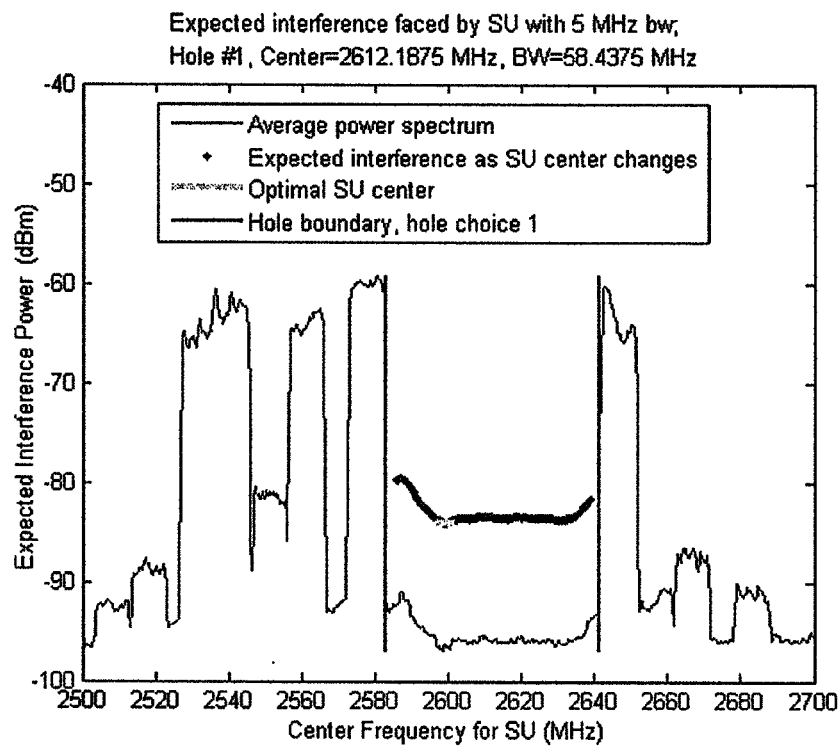

At the conclusion of this step, a vector of integration powers is obtained where the noise/interference power expected by the SU at any center frequency of operation, $f_{SU}$, within the hole is recorded. The optimal center frequency of SU operation is simply the frequency $f_{SU,optimal}$, where the integrated window power value is minimum. If the SU utilizes the channel with this center frequency $f_{SU,optimal}$ and with bandwidth $W_{SU}$, it is expected to receive minimal interference from PUs and other noise/signal sources. This is illustrated by FIG. 9 (2.5-2.7 GHz band).

The SU, however, is not restricted to operation only at center $f_{SU,optimal}$ within the same hole. Especially if contending SUs attempt to share the same hole, their channel centers should ideally be different. The expected average interference power at each possible center frequency for the SU is obtained from the vector of windowed integration powers calculated above. Beyond the average expected interference power, a time series of instantaneous interference powers reveals more information about the level of noise the SU would expect at different times of day.

It is straightforward to extract a time series plot of measured RF powers at any possible SU channel with center frequency $f_{SU}$, by integrating the SO power data during each sweep time between frequency values $$\left(f_{SU} - \frac{W_{SU}}{2}\right) \text{ to } \left(f_{SU} + \frac{W_{SU}}{2}\right)$$

as shown in (4). Since $f_{SU}$ can vary between the large range $$\left(f_c - \frac{B_{hole}}{2} + \frac{W_{SU}}{2}\right) \text{ to } \left(f_c + \frac{B_{hole}}{2} - \frac{W_{SU}}{2}\right)$$

where $f_c$ is the hole's center frequency, this would result in a large number of time series plots, and the analysis would become intractable. Thus a finite set of time series plots is obtained by varying $f_{SU}$ from the range $$\left(f_c - \frac{B_{hole}}{2} + \frac{W_{SU}}{2}\right) \text{ to } \left(f_c + \frac{B_{hole}}{2} - \frac{W_{SU}}{2}\right)$$

in steps of $W_{SU}/2$, and then calculating the time series at each of this finite set of $f_{SU}$ values.

$$\text{Power}(t)_i = \begin{cases} 0, & \text{when } B_{free,i} < W_{SU} \text{ during } t_i \\ \frac{B_{free,i}/W_{SU}}{B_{hole}/W_{SU}}, & \text{when } B_{free,i} \geq W_{SU} \text{ during } t_i \end{cases} \quad (4)$$

$$= \begin{cases} 0, & \text{when } B_{free,i} < W_{SU} \\ \frac{B_{free,i}}{B_{hole}}, & \text{when } B_{free,i} \geq W_{SU} \end{cases},$$

Figure 10:
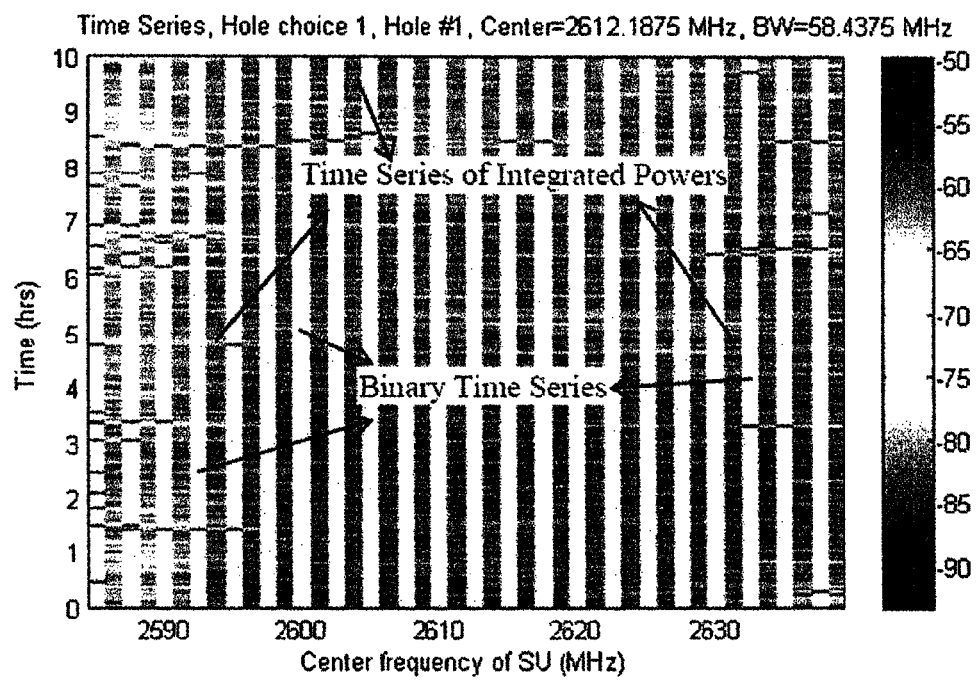
FIG. 10 is a two-dimensional compact plot for a set of time series graphs obtained from a spectrum hole, according to one embodiment of this invention.

The results in FIG. 10 include a 2-dimensional compact plot for the set of time series graphs obtained from one hole, where the horizontal axis represents the possible SU channel centers, the vertical axis represents time and the values of integrated powers are indicated by color intensity. Alongside the integrated powers' time series, an equal number of binary time series representations are interspersed in FIG. 10, where "red" meant "on" and "cyan" meant "off".

Although the SU channels lie within the spectrum hole, the primary user(s) could appear from time to time anywhere in the hole. PU arrivals in a channel with center $f_{SU}$ are observable as power spikes within the time series corresponding to that channel. Hence, a time series which tracks the variation in the channel's power levels is useful for developing models of PU activity, and to obtain statistics about the interarrival times and gaps between PU transmissions. The SU can then use the PU's traffic model and statistics to efficiently control its transmission times in the channel, and operate with low interference to itself and with minimal disruption to the incumbents' service. The extraction of the set of time series plots completes tier 2 of the CBM procedure. Tier 3 is concerned with further analyzing the time series plots of PUs' activities within the channels in an effort to statistically model PU traffic.

So far, it has been demonstrated how to automatically extract all the signals and holes from spectrum measurement data; then it was shown how to quantify the spectrum opportunity in any hole; next it was shown how to optimally select the center frequency for secondary user operation within the hole, what the expected average interference power will be, and finally how to extract the time series of integrated powers observed due to incumbent transmissions. All these steps facilitate DSA-based resource sharing between secondary and incumbent users. Tier 3 of the CBM procedure provides a time-varying model of the incumbent user's activity. The model is compact and tractable, and is capable of greatly assisting coexistence between legacy incumbent radios and smart secondaries.

PU modeling methods can be used to track PU behavior and construct an artificial PU traffic generator, and facilitate SU network access in that channel by taking advantage of knowledge about the PU's traffic characteristics. In one embodiment, the modeling procedure first involves thresholding the time series of integrated powers extracted above, where the threshold value is calculated by integrating the noise floor estimate across a frequency domain window of width $W_{SU}$ and center $f_{SU}$, and then adding an offset of several dBs. This gives a binary time series of On-Off activity within the sub-channel inside the broader spectrum hole. It is assumed, that all the On activity comes from PU signals, and that the PU is absent during the Off durations.

The total number of "calls" (separate instances of PU transmissions) that are measured during the entire duration is obtained from the time series. Depending on this total and on the rate of calls, the specific model is selected. This part needs researcher input. With a good background and understanding of the radio environment in that band, a statistical model that fits well with the PU transmissions in the band can be selected. Below, three such models are presented.

Model 1: Two-State Model (when Many Calls Observed)

If the number of calls is reasonably high, the first model is selected which is a simple time varying statistical model of the PU activity. First, the whole binary time series data is divided into windows of duration $T_{Win}$. Next, within each window, three sets for all the "hold" times (durations of On periods), "idle" times (durations of Off periods), and "interarrival" times (durations between the starts of consecutive calls) are extracted from the On-Off binary time series. The set of hold/idle/interarrival times is used to construct a histogram of hold/idle/interarrival durations. Then common probability distribution functions (pdf) like the lognormal, exponential, beta, gamma, etc. are curve fitted to each histogram, where the parameters of the fitting pdf function are estimated by using the maximum likelihood (ML) approach. Each fitted distribution is definable by a set of parameters—one parameter for the exponential, and a pair of parameters for the lognormal/beta/or gamma distributions. Thus in this first model, within the j'th time window of length $T_{Win}$, the PU traffic in the sub-channel can be described by 3 pdf distribution choices and 3 sets of parameters for each of the selected distributions of hold, idle and interarrival times.

Over a long period of time, the PU activity in the sub-channel of the hole can be tracked by updating the three sets of pdf distribution parameters within the j+1, j+2, j+n'th time windows. As the SO measures the spectrum continually, the model parameters are updated continually after every $T_{Win}$ intervals, which permits continuous tracking of the traffic patterns of the PU.

Model 2: Model as Poisson Process (when Few Calls Observed)

The second model is used when only a few calls are observed in the sub-channel. The small number of calls means that there are only small sets for the hold, idle and interarrival durations. This makes it difficult to estimate the ML parameters when attempting to fit standard probability distributions to measured histograms. Over long durations of time, analysis has showed that the hold times tend to be steady; that is, hold times across well separated call intervals are statistically similar. Thus, over a long observation window, it is possible to assemble enough instances of hold durations, such that a histogram of hold times can be obtained and modeled with a common pdf function. This is not the case, however, for idle and interarrival times as they vary significantly across time. In model 2, the lognormal pdf is used to curve fit only the histogram of hold times obtained from the full binary time series, where the parameters of the lognormal distribution are estimated by ML.

The time varying nature of the call rate in the channel is modeled with Poisson processes. The binary time series is divided into windows of duration $T_{Win}$. Within the j'th window, the number of separate calls, $n_{calls,j}$, is counted, and the call rate, $\lambda_j$, is calculated as (5):

$$\lambda_j = \frac{n_{calls,j}}{T_{Win}}. \quad (5)$$

When model 2 is applied to a synthetic traffic generator, the interarrival times between consecutive calls within the j'th window are generated by a Poisson process with call rate parameter $\lambda_j$. Once a call is generated, the hold time for it is selected by a lognormal random process that uses the ML parameters estimated earlier.

Figure 11:
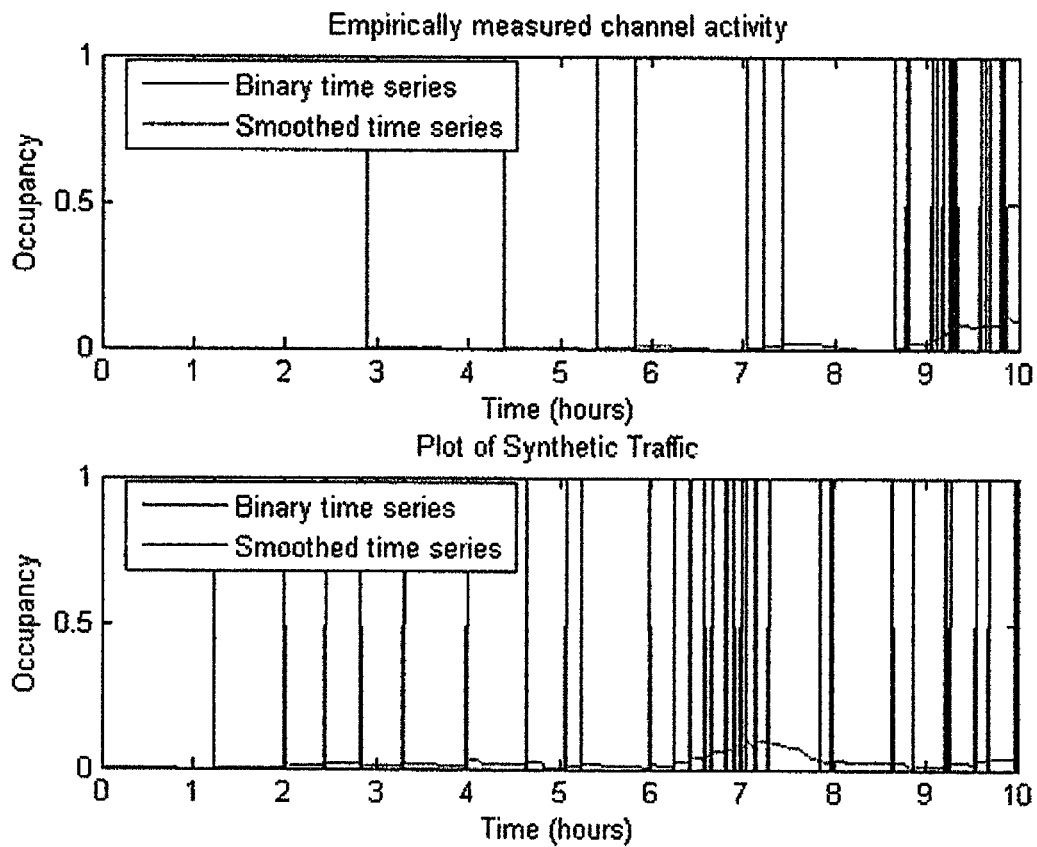
FIG. 11 shows the results of Model 2 according to one embodiment of this invention applied to track PU activity over 10 hours in a sub-channel within a hole.

For the 2.5-2.7 GHz band, the measured PU activity in the holes is low. Hence model 2 is applicable to track the PU activity within the sub-channels of the holes. FIG. 11 shows the results when model 2 is applied to track PU activity over 10 hours in a sub-channel within the Hole ID 2 (referenced in Table 1). The model of the PU is then applied to a traffic generator to make synthetic traffic that mimics the PU behavior within the sub-channel. Note, the simulated call generation activity is random and is not likely to match up with the time instances of the actual calls. However, the average occupancy fraction is expected to match closely between the real and simulated time series plots. A qualitative visual comparison of the two sets of plots in FIG. 11 shows that the average occupancy of the simulated traffic tracks that of the real traffic, but since there are so few calls generated (a handful of calls per hour); a complete match is not observed.

Model 3: Special 4 State Model for Land Mobile Radio Traffic

Figure 12:
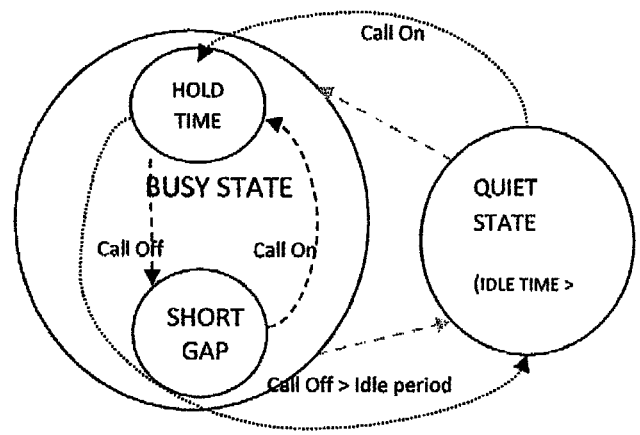
FIG. 12 illustrates four states of Model 3 according to one embodiment of this invention.

Model 3 is a specific model that was developed for modeling voice traffic in the LMR band. This model consists of busy and quiet states; the busy state in turn is subdivided into two sub-states, namely holds and gaps. The four states of this model are shown in FIG. 12. FIG. 12 also shows the allowed transition paths from one state to another. The histograms of the dwell time in each state are compared to common distributions—the lognormal distribution is used to model the holds and gaps; the gamma distribution models the busy and quiet states. Time-series' of parameters for the four distributions allow the model to track the traffic in any channel for long time periods. In one embodiment, this model is specifically used for analyzing the LMR band holes.

In embodiments of this invention, all the information extracted from the CBM is assembled into a representation format that is tractable, compact and machine-readable. This method borrows ideas from the abstraction tool used in computer programming, that is, an "Object". In software code, objects are passed from one module to another, where within the abstract object, all the necessary fields that a module needs are stored. The fields are called "properties". This greatly simplifies the task of coding and broadens the scope for rapid development of complex software applications. Apart from information storage properties, software programming objects also incorporate built-in methods—that is modules closely related with the object that performs frequently needed computations and programmed tasks.

Similarly, the motivation for using the Hole-Descriptor Object (HDO) is to conveniently store all the location and modeling information about a hole in a compact format, which can then be communicated (passed on) to secondary users attempting to dynamically share the spectrum with primaries. Just like a programming object's methods, the HDO design includes computational functions that can calculate the SOF, estimate the hole's occupancy percentage from the PU model, and generate synthetic PU traffic—all of which an SU radio can commonly utilize to select its operational frequency and DSA transmission parameters. In fact, the HDO output of the CBM is stored and manipulated in practice as a computer programming data-storage object. In principle, any language like Python, Java, C++, etc. that supports object-oriented programming can be used to represent and manipulate HDOs.

The HDO can store the following properties related to Tier 2 information about the full spectrum hole: (i) Hole center frequency, (ii) Hole bandwidth, (iii) a vector of average power spectrum densities across the frequency points in the hole, (iv) a vector containing the histogram of average PSD observed in the hole over time, and (v) a vector storing the SOF versus SU bandwidth for the hole. The properties i-v are applicable for the entire hole bandwidth $W_{hole}$. Recalling from above, the hole is sub-divided into multiple sub-channels where SUs with a lower bandwidth $W_{SU}$ can operate. The next set of properties applies only to a single sub-channel with center $f_{SU}$:

(i) The sub-channel frequency within the hole that the SU can utilize referenced by $f_{SU}$
(ii) The sub-channel BW, $W_{SU}$
(iii) Average PU occupancy observed from the extracted time series
(iv) Window length $T_{Win}$ used in modeling the time series of PU activity
(v) Model type 1, 2 or 3 used
(vi) Pdf distribution types used for each of the states of the corresponding model (lognormal/exponential/gamma/etc.)
(vii) Vectors for each of the time-varying parameters related to each of the state distributions A numerical example demonstrates why HDO objects are so useful. Assume that there are 3 holes, within a spectral band. The next assumption is that each of the holes on average supports 5 sub-channels. The total number of HDOs required to describe the band is 3×5=15.

Properties i and ii are 1 unit in length, and assume that the vectors for properties iii-v are of length 30 units each. Next we assume that the modeling window has duration, $T_{Win}$=2 hours; and that we need to track each sub-channel for a day (24) hours. Properties vi-x are each 1 unit long. Assume model type 1 is used for the time series in each sub-channel, that lognormal pdf is used for the hold times' distribution, and that gamma pdf describes the idle times' distribution. Each of these distributions have 2 parameters each, and modeling 24 hours with a 2 hour window duration gives 12 instances of each parameter pair. This means that for tracking PU activity within a single sub-channel, the total unit length is calculated as 2×2×12=48 units. The size of each HDO is thus: 1+1+(3×30)+1+1+1+1+1+48=145 units.

Thus for the 15 HDOs that summarize all necessary information in the band that would permit dynamic spectrum access, the total length is 15×145=2175 units. Assuming 2 bytes per unit, the required memory space to store this is only 4.35 kB. Compare this to the total size of the spectrum data matrix—for example, to store 24 hours of measurements in the 2.5-2.7 GHz band over 24 hours takes 22.2 MB, and yet the HDO summary is only in the order of a few kilobytes, that is, a reduction in size of nearly 4 orders of magnitude! Thus HDO simplifies, compacts, and summarizes the usable findings from spectrum measurement data in a highly tractable format that facilitates DSA usage.

The HDO also provides methods that can be executed by the SU to output relevant information. Exemplary methods include, without limitation:

(i) From the average PSD vector, the method calculates the expected PU interference on the sub-channel used by SU.
(ii) From the PU model parameters, the method estimates the average PU occupancy.
(iii) Synthetic PU traffic generator methods (one for each model)—this is currently used by the author to validate the models of PU activity, and in simulations of PU and SU coexistence.

The HDO structure is flexible, and additional properties and methods can be easily added as deemed necessary by the researcher. Particularly, if alternate PU traffic models are developed in various spectrum bands, the HDO can incorporate the newer models. The HDO object can also be inherited when working with more complex derived classes. In all, the HDO design of the CBM provides a powerful tool to researchers and engineers building DSA radios.

The CBM procedure can also be applied to the 500-698 MHz region that includes TV channels and TV white spaces, and to LMR (450-474 MHz) band data. The TVWS spectrum measurements were obtained by the IITSO, and the LMR measurements were made by the USRP sensor. The results were based on data captured by the RFeye sensor in the 2.5-2.7 GHz band. The goal here is to show that the CBM procedure is versatile and platform independent that is applicable on spectrum measurements made by a variety of sensors and in different frequency bands.

The following summarizes the steps of embodiments of the method, as detailed further above: (i) noise floor estimation, (ii) extracting clusters of signal and hole data points by analyzing spectrum matrix data sweep by sweep, where each data point contains 4 fields of information, (iii) extraction of Signals and Holes: from the cluster of signal/hole data points, generate histograms of start and stop frequencies for the signal/hole—then associate the start and stop frequency peaks to determine information about the signals'/holes' center frequency and bandwidth, (iv) analysis of the spectrum holes to determine Spectrum Opportunity Fraction versus SU bandwidth, and expected interference power at each possible $f_{SU}$, (v) optimal selection of the secondary user center frequency, (vi) extraction of sets of time series of PU data for varying $f_{SU}$, (vii) modeling the time series data in each sub-channel, and (viii) creation of the HDO object with all information about a hole in tractable form.

In the US, TV white spaces refer to 6 MHz wide channels within the VHF and UHF TV bands that do not have a TV signal at a particular location. The TV White Space approach for DSA focuses on enabling geographically based two-tier sharing between existing TV stations, the primaries, and secondary users who are allowed to use the spectrum only in specified areas where TV coverage does not exist in the TV channel of interest. Currently, TVWS devices like the IEEE 802.22 must consult a geographic database to identify the empty TV channels to use. Due to the intense focus TVWS has received in relation to DSA, the TV band is an obvious choice to test CBM performance.

Figure 13:
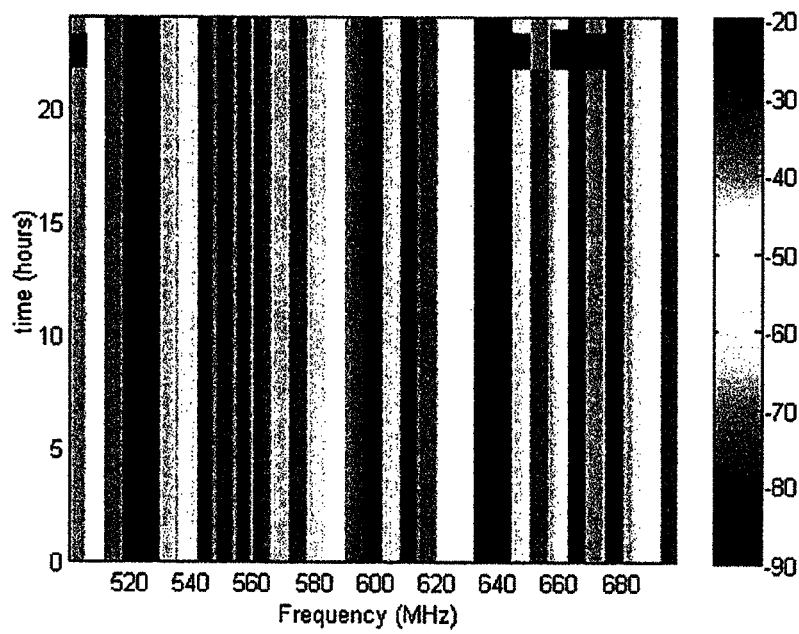
FIG. 13 is a spectrogram of a two-dimensional matrix of measured spectrum powers spanning 24 hours, according to one embodiment of this invention.
Figure 14:
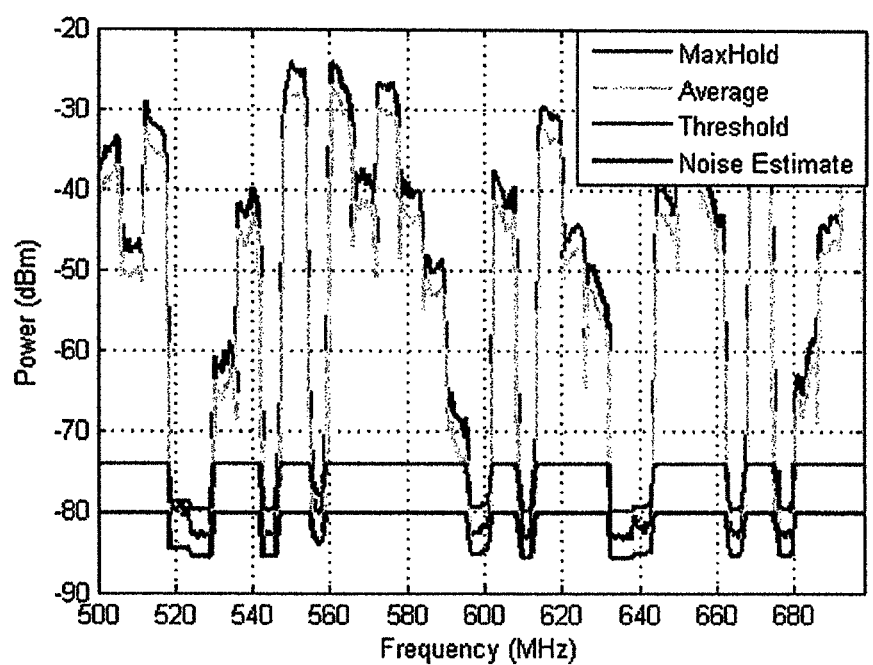
FIG. 14 shows power spectrum plots and noise floors according to one embodiment of this invention.
Figure 15:
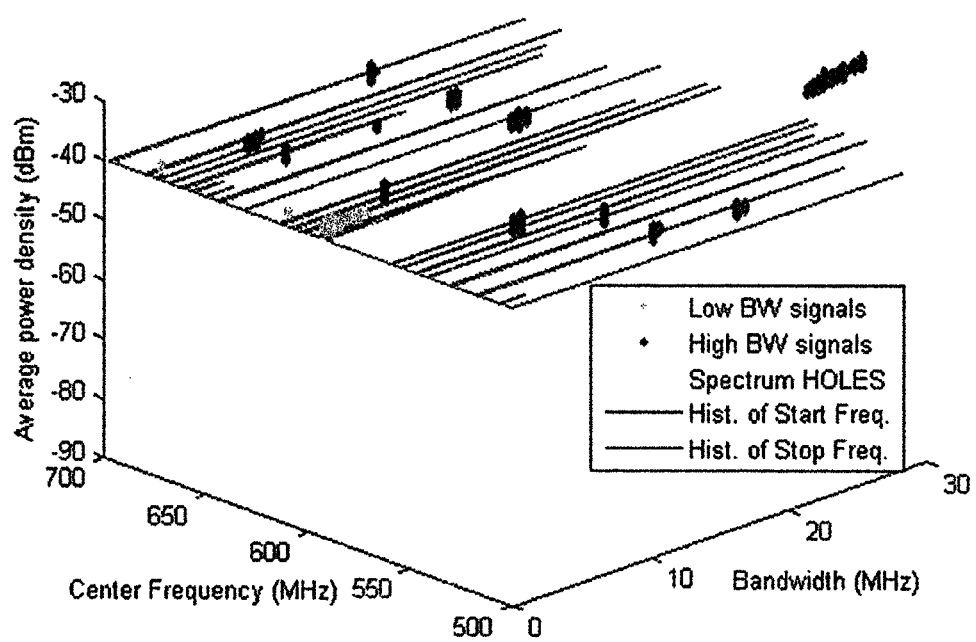
FIG. 15 includes plots of the cluster of signals and holes according to one embodiment of this invention.

In FIG. 13, a 2-D matrix of measured spectrum powers spanning 24 hours, is plotted as a spectrogram. The selected date is Mar. 1, 2014 and the frequency band is 500-698 MHz. The measurements were made by the IITSO with a 54 second time resolution. The average and maxhold power spectrums were calculated from the FIG. 13 2-D matrix. The noise floor was found using the automated noise estimation algorithm, and a threshold 4 dB was selected above the noise estimate. FIG. 14 shows the power spectrum plots and the noise floor. The cluster of signals and holes were extracted as described above, and this is plotted in FIG. 15. The signals are clearly distinct from the holes and lie in a higher power plane. The high power of the TV channels makes CBM procedure accurate. Next, the frequency locations of the holes were found as described above in Method A. Table 2 lists the 8 holes identified. Comparing with FIG. 15, it is obvious that there are 8 TVWS channels in the 500-698 MHz region. Thus the results of Table 2 are verified.

TABLE 2

Information about Extracted Holes in 500-698 MHz TV white space, Chicago (Mar. 1$^{st}$, 2014)

| Hole ID | Frequency Information about the Hole | | |
|---|---|---|---|
| | Start (MHz) | Stop (MHz) | Bandwidth (MHz) |
| 1 | 518.07 | 530.97 | 12.37 |
| 2 | 542.35 | 546.63 | 4.76 |
| 3 | 555.20 | 559.01 | 4.28 |
| 4 | 595.66 | 601.85 | 6.66 |
| 5 | 608.51 | 613.27 | 5.24 |
| 6 | 632.31 | 643.74 | 11.9 |
| 7 | 662.30 | 667.54 | 5.71 |
| 8 | 674.68 | 679.91 | 5.71 |

Figure 16:
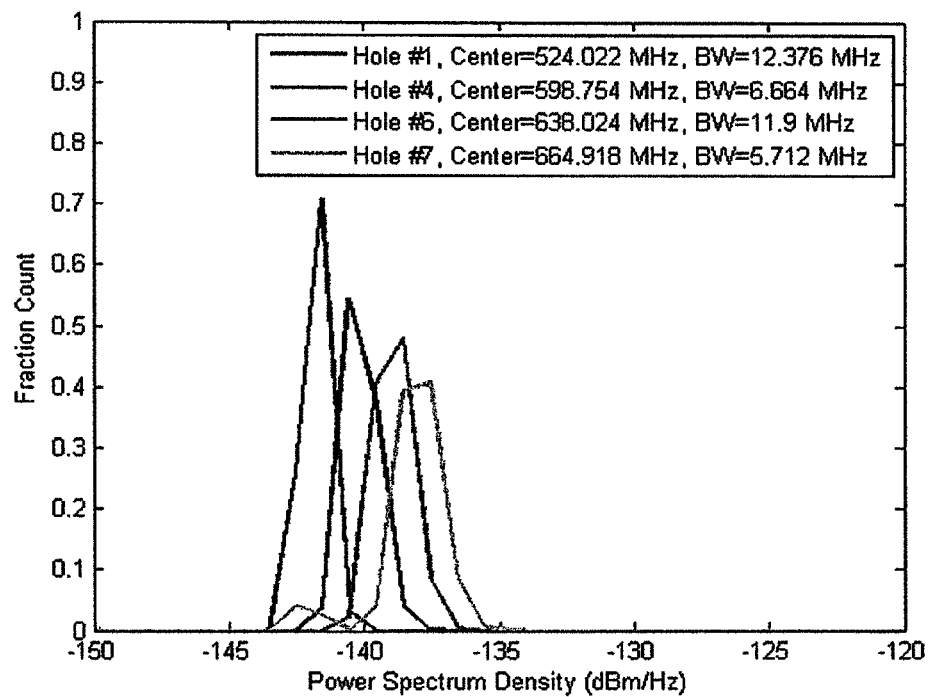
FIG. 16 includes PSD histograms plotted for four selected holes according to one embodiment of this invention.
Figure 17:
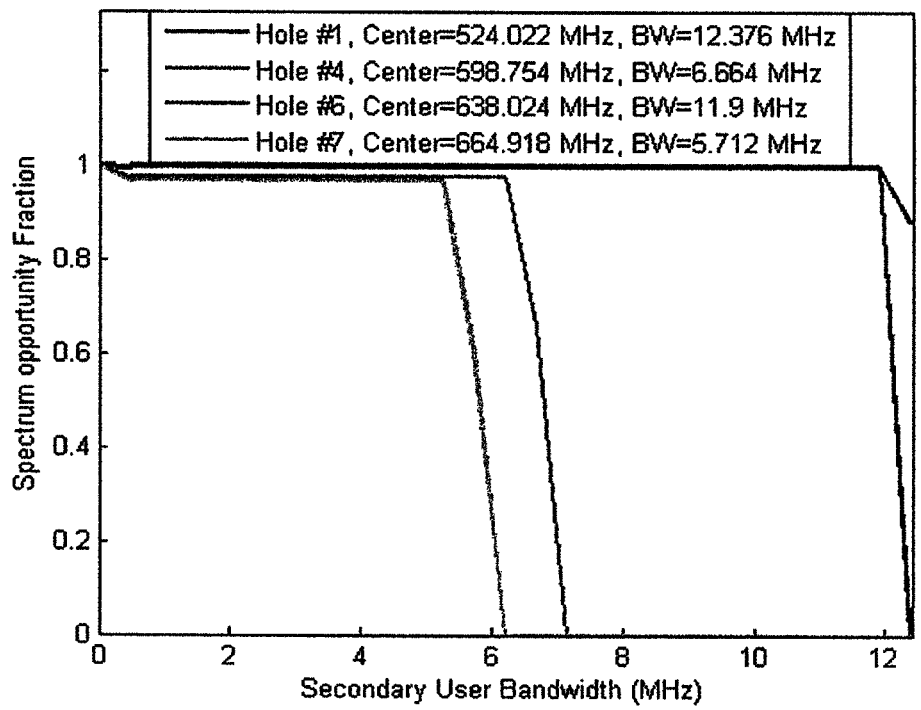
FIG. 17 illustrates SOF versus SU bandwidth according to one embodiment of this invention.
Figure 18:
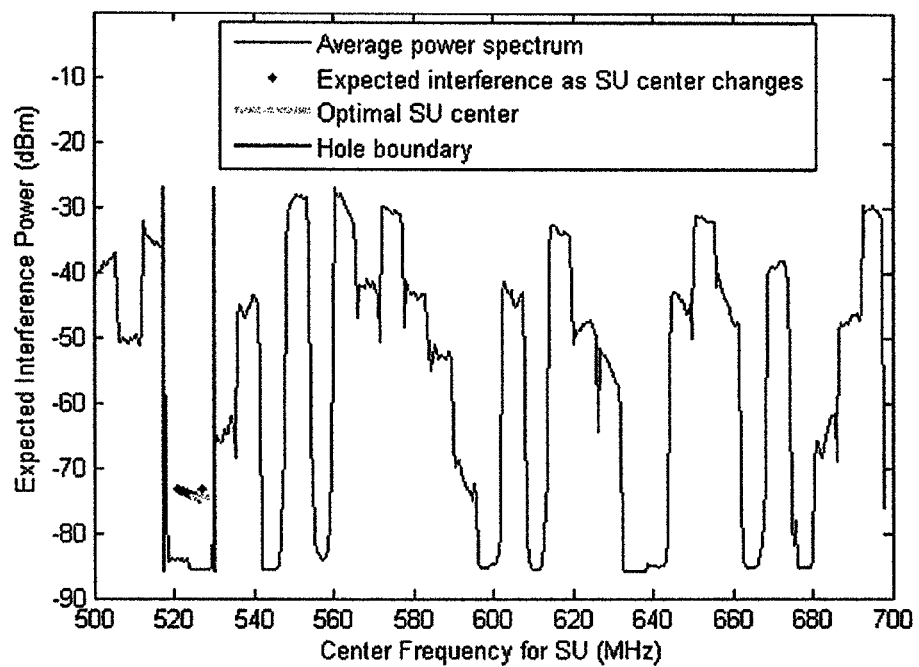
FIG. 18 illustrates an optimal center frequency of operation for a SU of bandwidth 5 MHz for a hole according to one embodiment of this invention.
Figure 19:
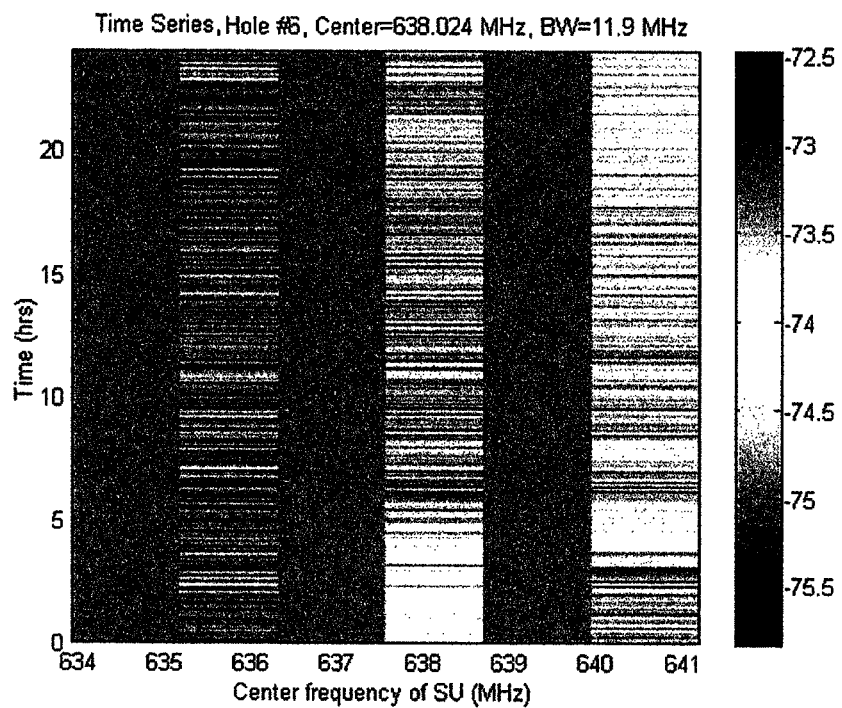
FIG. 19 shows three time series plots for a hole according to one embodiment of this invention.

The spectrum holes were then further analyzed to obtain a histogram of PSD values. The PSD histograms were plotted for four selected holes in FIG. 16. This shows that the holes with IDs 1, 4, and 6 (from Table 2) had lowest background noise, but Hole ID #7 suffered from higher interference. This means that Hole ID #7 was less suitable as a secondary use channel. Next, the SOF versus SU bandwidth plot was obtained and is shown in FIG. 17. The results show that the holes can support secondary users with a wide range of bandwidths, and that the SOF value holds close to 1 for bandwidths nearly as high as the hole's bandwidth, $B_{hole}$. The optimal center frequency of operation for a SU of bandwidth 5 MHz is shown in FIG. 18 for Hole ID #1. To properly examine the suitability of DSA in a hole, the set of time series were extracted for each hole. FIG. 19 shows three time series plots for Hole ID #6. All the time series show zero occupancy. This means there was no PU activity in the sub-channels and that they are highly suitable for DSA.

The time series were modelled by Model 2 (Poisson process), due to the low number of PU arrivals in the measured data. The model was used to generate synthetic traffic data representing PU activities in several sub-channels. The synthetic traffic also showed zero occupancy, just like the empirically measured traffic. Due to zero occupancy, the plots of empirical and synthetic traffic were uninteresting and similar to a zero activity plot. Finally, HDO objects were created that summarize all the information in each of the holes in the 500-698 MHz band.

In another example, the LMR 450-474 MHz band was selected as a candidate test band for the CBM procedure. The land mobile radio channels had been allocated by the FCC primarily for voice communications by state and local government agencies, and commercial entities. Public safety agencies like police and fire departments use LMR systems for communication between dispatch centers and mobile field agents, or for direct mobile-to-mobile communications. Similarly, commercial users often employ LMR for "walkie-talkie" mode two-way communications. In urban areas, most of the limited number of LMR channels available in the VHF (148-174 MHz) and UHF (450-512 MHz) bands are already allocated to specific users. During emergency situations when federal, state and city agencies may converge in a geographic locale, DSA could be applied to increase the pool of voice channels available for public safety use. The measurements were obtained by the USRP software defined radio sensor specially purposed to conduct LMR channel measurements with a 12.5 kHz resolution and a 250 ms time sweep.

Figure 20:
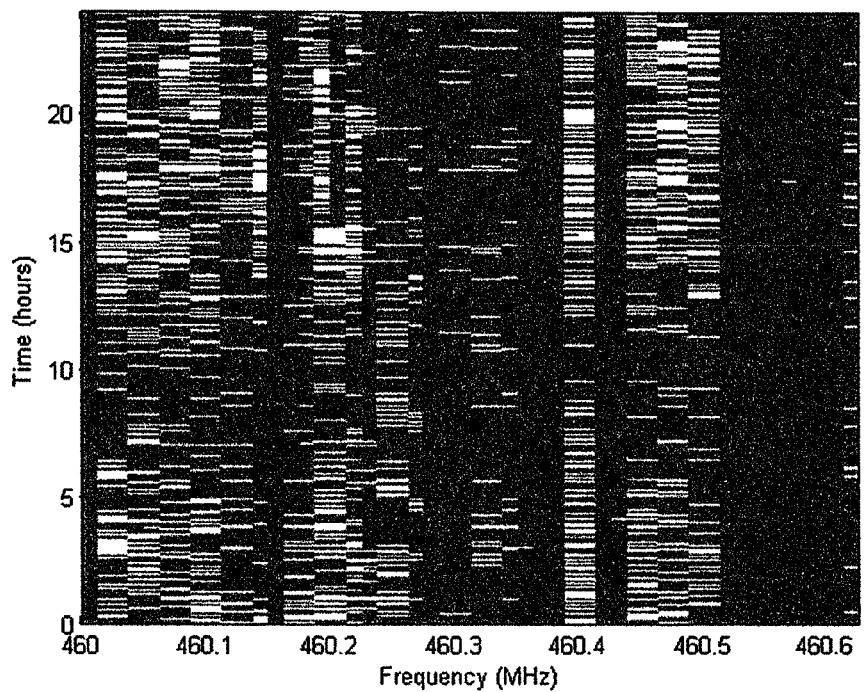
FIG. 20 shows a binary two-dimensional matrix for measurements of LMR, according to one embodiment of this invention.

FIG. 20 shows a binary 2-D matrix for measurements of LMR channels made on Sep. 15, 2011. The spectrum data file used in this analysis only stored binary spectrum data and not the actual power measurements. Originally when the data-file was created, the binary matrix was obtained by pre-processing the 2-D matrix of measured LMR power values and comparing them to a fixed threshold value. Hence, the automatic noise floor estimation algorithm was supplanted by the use of a fixed noise floor. The channels shown span the frequencies 460.000 to 460.625 MHz. The channels were in use by the Chicago Police Department (CPD) and this was before the "narrowbanding" deadline of Jan. 1, 2013. Hence, most of the channels shown in FIG. 20 are 25 kHz wide.

Since the measurement interval was 250 ms, the data plotted over 24 hours in FIG. 20 represents 345,600 sweeps. Computationally, it would take a long time to process so many measurements. Hence, a subset of the measurements representing 86,400 sweeps or the six hour stretch between 10 am and 4 pm on Thursday, Sep. 15, 2011 was analyzed, and the results are presented herein. The time period 10 am to 4 pm was deliberately selected for analysis, since late morning to late afternoon usually has the highest number of LMR call activity during a typical weekday.

Figure 21:
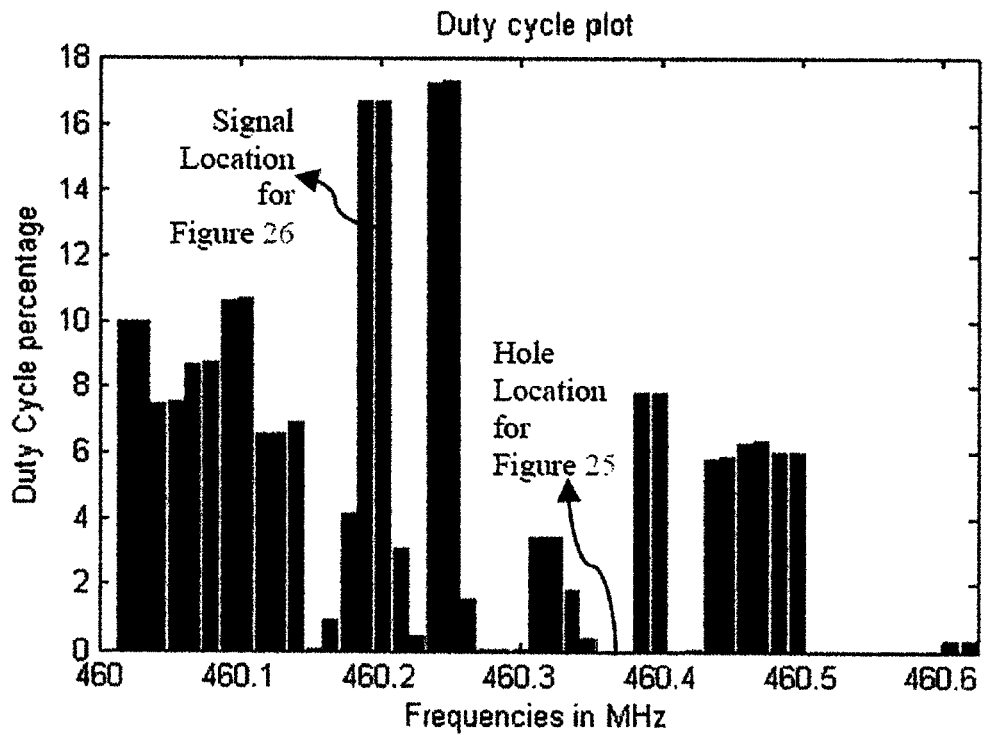
FIG. 21 is a bar chart showing the percentage duty cycle at each measured frequency point during a 6 hour analysis period, according to one embodiment of this invention.

The bar chart in FIG. 21 shows the percentage duty cycle at each measured frequency point during the 6 hour analysis period. From FIG. 21, it is possible to see that the frequency points with high duty cycle values are probable signal locations, while the low duty cycle regions are holes. FIG. 21 also indicates the locations of the LMR channels that are subsequently analyzed in FIGS. 22 and 23.

From the 2-D matrix, the clusters of data points for signals were extracted using the method described above. Method B described above was then used to identify the start and stop frequencies, and bandwidths of all the signals. Method B identified and extracted a total of 16 signal locations—13 signals were 25 kHz LMR channels and 3 were 12.5 kHz wide. However, the holes' locations are of greater interest due to this paper's focus in DSA. Using Method B, the locations of all the holes were simply identified as the frequency regions not spanned by any of the identified signals. That is, the hole locations were complementary to the signal locations. Table 3 lists the 7 holes identified. Comparing with FIG. 21, it was obvious that there were 7 distinct regions within the 460-460.625 MHz LMR channels that had very low duty cycles (below 0.5%). Thus the results of Table 3 and Method B of Tier 1 of the CBM procedure were verified. Method A was also tried in this LMR band, but poor results were obtained. As mentioned before, Method B is better suited for spectral bands where the signals switch rapidly, such as with LMR.

TABLE 3

List of Extracted Holes in 460-460.625 MHz LMR band, Chicago (Sep. 15$^{th}$, 2011)

| Hole ID | Frequency Information about the Hole | | |
|---|---|---|---|
| | Start (MHz) | Stop (MHz) | Bandwidth (kHz) |
| 1 | 459.9937 | 460.0063 | 12.5 |
| 2 | 460.1437 | 460.1812 | 37.5 |
| 3 | 460.2188 | 460.2313 | 12.5 |
| 4 | 460.2687 | 460.2813 | 12.5 |
| 5 | 460.3312 | 460.3813 | 50.0 |
| 6 | 460.4063 | 460.4312 | 25.0 |
| 7 | 460.5063 | 460.6313 | 125.0 |

Figure 22:
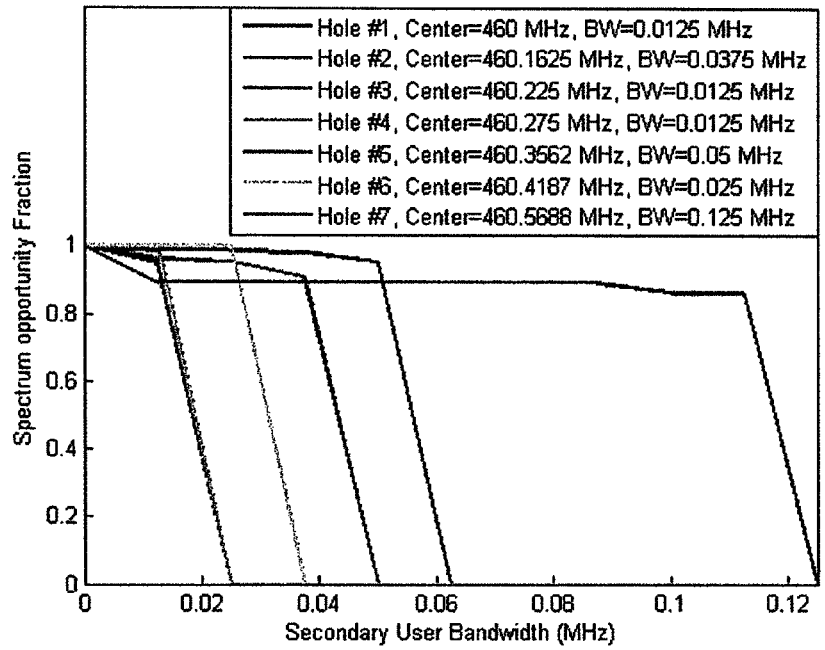
FIG. 22 includes plots of a spectrum opportunity fraction versus secondary user bandwidth, according to one embodiment of this invention.

After the 7 holes were identified, plots of the spectrum opportunity fraction versus secondary user bandwidth were obtained as shown in FIG. 22 using the method described above. For Hole IDs 1 to 6, the SOF stays close to 1 for SU bandwidths equal or lesser than the hole's bandwidth. This means there will be low interference experienced by secondaries operating in those holes. Hole 7 has a lesser SOF value. Thus, an SU operating in Hole ID#7 would experience some interference from the PU.

Figure 23:
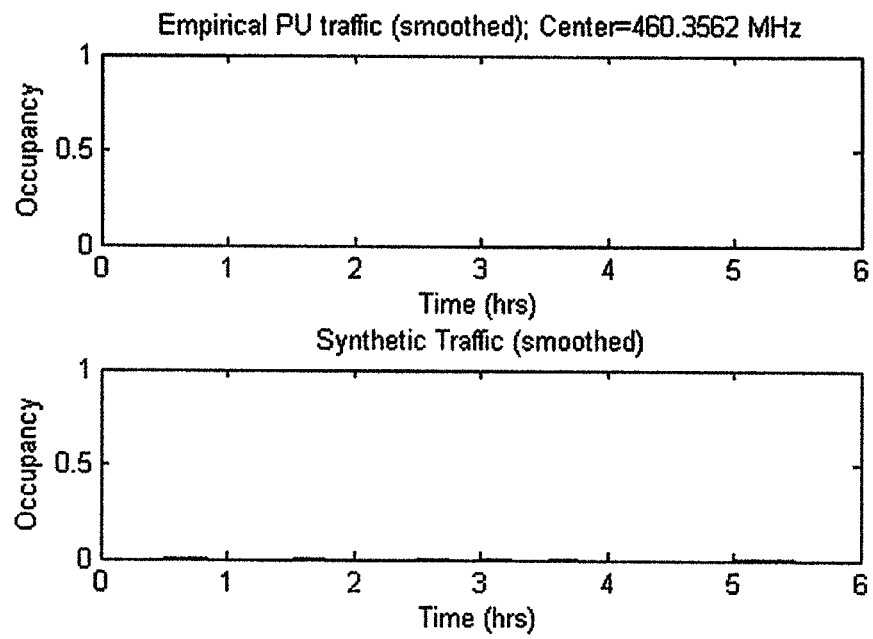
FIG. 23 shows a 4-state LMR traffic model used to generate synthetic PU traffic according to one embodiment of this invention.

After the frequency information about the holes was obtained, the set binary time series' of PU activities for all the holes was extracted. The 4-state Model 3 was then applied. For each hole, the PU activity within every 20 minute window was modelled, and the 6 hour time span was divided into 18 separate modeling windows. Within each 20 minute window, the 4-state model uses 4 pdf distributions giving a total of 8 parameters. This means that 8×18=144 parameter values need to be stored and handled to properly track PU traffic. A hole-descriptor object was generated to model the time series in each hole, and the HDO conveniently stores all these numbers with 8 vectors. Each vector represents one of the 8 parameters of the 4-state model and was of length 18 to track the parameter variations over the full 6 hour time span. Above it was mentioned that the HDO is provisioned with methods for generating artificial traffic. The 4-state LMR traffic model was used by the HDO Method (iii) to generate synthetic PU traffic as shown in FIG. 23. FIG. 23 also shows the empirically measured PU traffic over the 6 hour period. FIG. 23 is quite unexciting as both the measured and synthetic plots show zero occupancy. This is expected as the CBM algorithm correctly identified the holes where the PU activity should be as low as is seen in FIG. 23.

Figure 24:
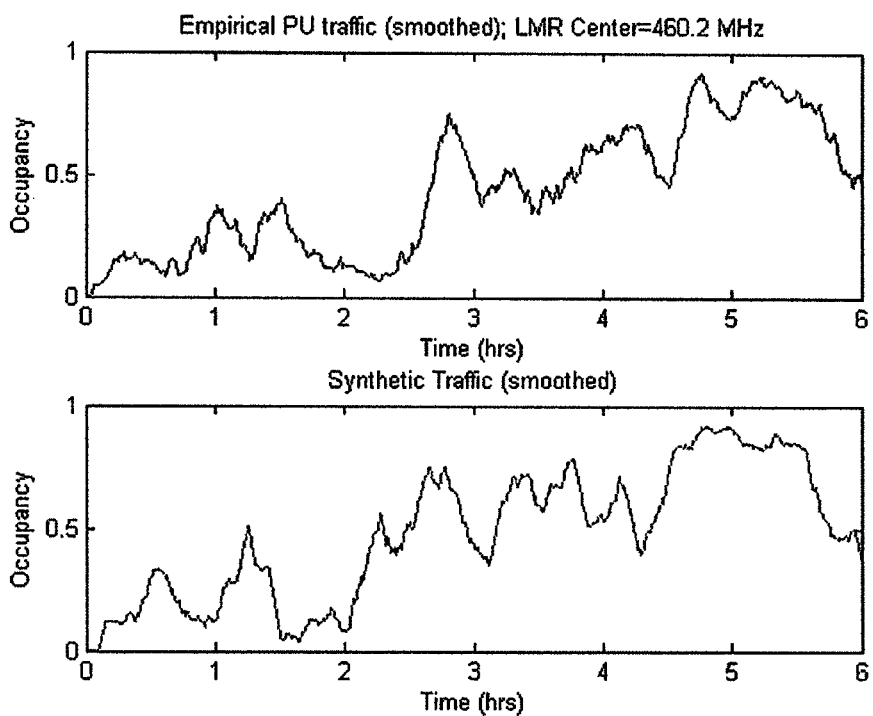
FIG. 24 is a plot of empirically measured PU traffic compared with PU activity synthetically generated by a 4-state model contained in an SDO, according to one embodiment of this invention.

To properly test how well the 4-state model for LMR traffic fits with measured data in a high activity LMR channel, it was necessary to apply it to a channel identified as a "signal location" by the CBM procedure. This was done for the LMR channel centered at 460.2 MHz which was classified as a signal by CBM. Analogous to HDO, a Signal-Descriptor Object (SDO) was generated with frequency and bandwidth information about the signal in the 460.2 MHz LMR channel. Also, to track the PU traffic over the 6 hour period, the SDO stores a set of 8 vectors of parameter values for the 4-state model. FIG. 24 plots the empirically measured PU traffic and compares it with PU activity synthetically generated by the 4-state model contained in the SDO. Both the plots were smoothed with a 15 minute moving average filter to reveal peaks and trends in the LMR activity. The results show that the synthetic traffic follows the general trends of the empirical PU traffic. Exact match is not seen, since the synthetic traffic is generated by a random call initiation process and the calls are of random duration.

The results demonstrate the versatility and accuracy of the CBM procedure. Particularly, the utility of Method B for extraction of holes has been demonstrated by its application on LMR measurement data. The 2.5-2.7 GHz and 500-698 MHz TVWS examples have already demonstrated the utility of "hole extraction Method A". The usefulness of HDO/SDO to compactly represent hours of information about the radio environment and PU traffic in a white space/signal is also seen.

The proposed CBM has applications in upcoming cognitive radio (CR) networks employing DSA technologies. By regulation, IEEE 802.22 CRs operating in TV white spaces have to consult a database to identify the white space TV channels where they can operate at a particular geographical location. Although TV broadcast channel locations are reliably recorded in the geographic database, often the locations of wireless microphones in the TV bands are not. The microphones are classified as devices protected from IEEE 802.22 interference. The CBM procedure can be implemented on TV white space measurements obtained by a spectrum observatory that senses the RF environment at the network location. In this application, the SO communicates the CBM outputs (the HDOs) to IEEE 802.22 radios, where the HDOs identify spectrum holes ideal for CR operation and free from interference with any measured wireless microphone transmissions.

Apart from IEEE 802.22, next generation CRs would likely have the need to rapidly scan wide bandwidths and quickly identify operating frequencies that are free from PU interference. Commercial radios should be inexpensive in order to be economically viable in the mass market, but wideband sensing hardware adds cost to CR systems. The CR's spectrum sensor may suffer from the hidden node problem, shadowing, and other effects in the radio path like absorption that limit its sensitivity. An alternative would be to outsource the sensing function of the CR network to a spectrum observatory. A single well-designed SO has high sensitivity and can provide the service of identifying good secondary usage channels to a large number of CRs operating in the area. The SO would implement the CBM procedure to obtain a set of HDOs in the frequency bands of interest and communicate this set as a service to the next generation CR networks. Thus, the method of this invention expands the scope of spectrum observatory systems beyond the current application of simply monitoring and auditing radio use to one of practical utility, where the SO facilitates operation of DSA networks.

Figure 25:
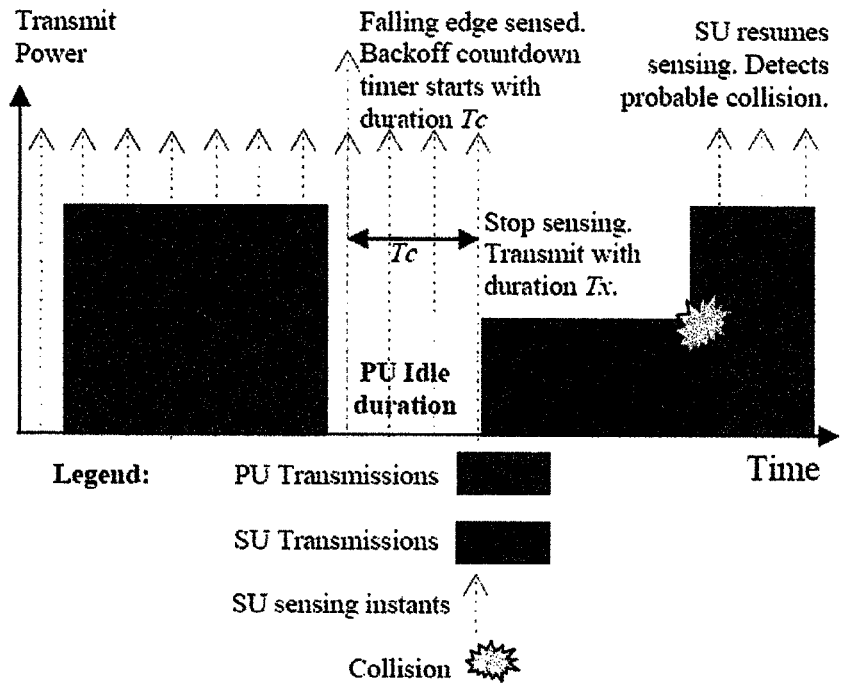
FIG. 25 illustrates how an LBT technique works according to one embodiment of this invention.

To demonstrate the utility of the CBM procedure in practical DSA coexistence systems between PU and SU radios, the common Listen-Before-Talk (LBT) medium access control (MAC) technique was applied in three sets of Monte-Carlo (MC) simulations. A simulation environment was developed that uses empirically measured PU traffic from the binary time series of PU activity. For each MC run, the binary PU time series was extracted from the spectrum powers matrix as described above. The SU used a simple LBT algorithm to share the channel with the PU. FIG. 25 illustrates how the LBT technique works.

The SU sensed the channel first; if the PU was absent or if the channel was observed to transition from busy to vacant, then a countdown timer of random duration $T_c$ was started. If the PU does not return during this countdown interval, the SU transmits for a random duration $T_x$. During the transmission state, the SU cannot do channel sensing, and hence collisions can occur if the PU returns. $T_c$ is a uniform random variable between $[T_{slot}, T_{Cmax}]$ and $T_x$ is uniform between $[T_{slot}, T_{Xmax}]$, where $T_{slot}$ is the time-slot used in the simulation and $T_{Cmax}$ and $T_{Xmax}$ are, respectively, the maximum countdown timer and the maximum transmit duration. The $T_{Cmax}$, $T_{Xmax}$ are constant for all the MC simulations. The 2.5-2.7 GHz band was used in this MC study where the SO measured PU activity every 10 seconds. Hence, $T_{slot}=10$ s, and the LBT parameters were set to $T_{Cmax}=2 \cdot T_{slot}=20$ s and $T_{Xmax}=4 \cdot T_{slot}=40$ s. Each MC run simulates 10 hours of PU and SU coexistence, where the channel center was $f_{SU}$ and the channel bandwidth, $W_{SU}$, is 5 MHz.

As mentioned above, three sets of MC simulations were performed that correspond to the following three scenarios:

(i) The SU selects any channel within the 2.5-2.7 GHz band with center frequency $f_{SU}$ and bandwidth $W_{SU}$. This represents the practical scenario where a DSA radio does not have access to a geographic spectrum allocation database, and hence randomly selects an operation channel and attempts to share it with LBT.

(ii) In the second scenario, the SU selects any channel randomly, but within the identified "holes" or white spaces. This is analogous to the case where the DSA radio has access to a geographic spectrum database, or has access to partial results of the CBM procedure; but it has no information about the ideal channel to use within the hole. The center frequency $f_{SU}$ and bandwidth $W_{SU}$ lie within the hole.

(iii) In the final scenario, the SU has full access to the results of the CBM procedure, and operates on the optimal channel of the hole with $f_{SU,optimal}=2599$ MHz.

Figure 26:
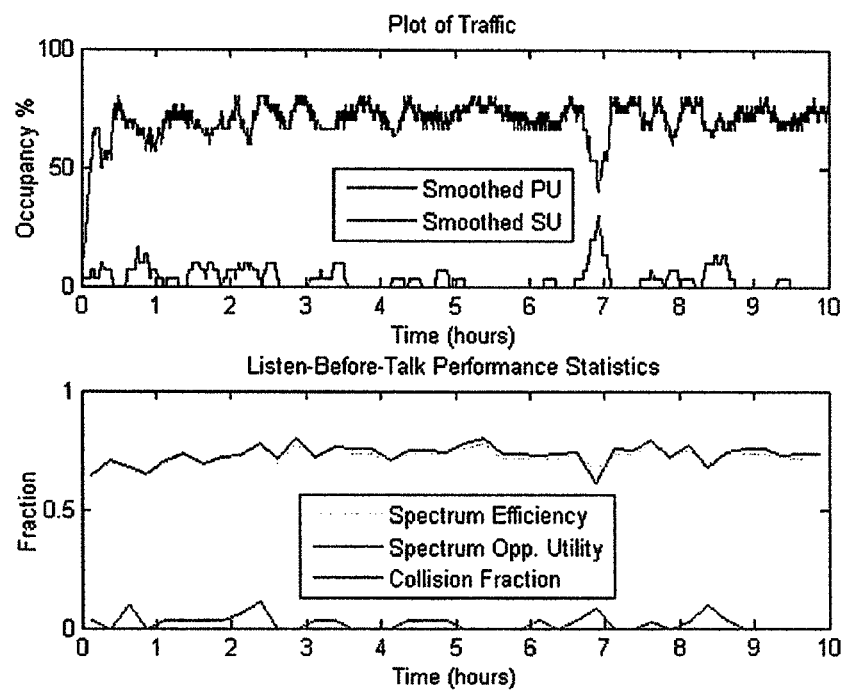
FIG. 26 is a plot for values of a 10 hour simulation run according to one embodiment of this invention.

During each simulation run, the fraction of SU packets that collide, i.e., the "Collision Fraction" (CF); the fraction of time there is any PU or SU transmission, i.e., the "Spectrum Efficiency" (SE); and the fraction of the PU's off-time utilized by the SU, i.e., the "Spectrum Opportunity Utility" (SOU) are noted at every 15 minute interval. SOU differs from the "Spectrum Opportunity Fraction" (SOF) in the sense that the SOF indicates the total spectrum opportunity available in a channel, while the SOU refers to the actual opportunity utilized by the SU radio. FIG. 26 plots these values for a 10 hour simulation run corresponding to the first DSA scenario, where a SU radio with 5 MHz bandwidth randomly selected $f_{SU}=2587.5$ MHz as its operating frequency. The PU and SU activities are also plotted. Notice that when PU activity increases, the number of collisions and CF increase, and the SU throughput is throttled down by the LBT MAC. The SE and SOU are very similar in this case as PU activity is rare—meaning that the spectrum efficiency is dominated by the SU, and hence SE≈SOU.

At the end of the simulation run, the average values for the SE, SOU, and CF are calculated. For each of the three scenarios, the Monte Carlo simulations were run a thousand times. Each time, the channel centers for scenarios i and ii changed randomly, but the channel was fixed for scenario iii. Across the 1,000 simulation runs, the overall average SE, SOU and CF are shown in Table 4.

TABLE 4

Average results for 1,000 MC simulations
where SU uses LBT MAC to coexist with PU

| Results | Scenarios | | |
|---|---|---|---|
| | i | ii | iii |
| Spectrum Efficiency SE | 72.9% | 72.6% | 72.7% |
| Spect. Opp. Utility, SOU | 58.2% | 74.0% | 74.3% |
| Collision Fraction, CF | 18.4% | 0.485% | 0.00% |

The results show that the worst performance was seen for the first scenario where the SU has no information about the wireless band. This was expected. The observed CF of 18.4% would make DSA unfeasible, as primary user protection was greatly compromised. When only the frequency locations of the hole were known to the SU as in the second scenario, the collision rate falls greatly, and SU performance increased. The third scenario performs slightly better than the second due to the selection of the optimal secondary use channel. It must be noted, however, that none of the scenarios were able to exceed a SOU of 75%. This is because in LBT, the SU is "quiet" for a significant amount of time "listening". As such, the LBT MAC scheme was used only to compare the performance of DSA in three different scenarios. A more elaborate DSA MAC scheme is likely to achieve higher SOU values in the optimal scenario case, compared with simple LBT MAC.

The results demonstrate the advantages of using the method of this invention to support SU operation in a DSA radio environment. The extracted hole's frequency information helps the SU avoid incumbent user frequencies. This greatly reduces interference on the incumbents. Additional information like the optimal SU channel location further improves SU throughput and lowers the interference experienced by the PU. The SUs in scenarios ii and iii use information about the wireless band from the CBM procedure to greatly outperform the scenario i radio, where the SU is handicapped without CBM.

The models of primary user activity generated by the CBM are usable to further enhance DSA to improve spectrum utilization. The advantage of knowing the PU's traffic characteristics has been demonstrated. The mathematically modelled probability and cumulative distribution functions of PU idle time can be used by the SU's spectrum access policy decision block to achieve throughput maximization. Thus, the CBM procedure can be used to support elaborate DSA systems that incorporate the optimal scheme.

Figure 27:
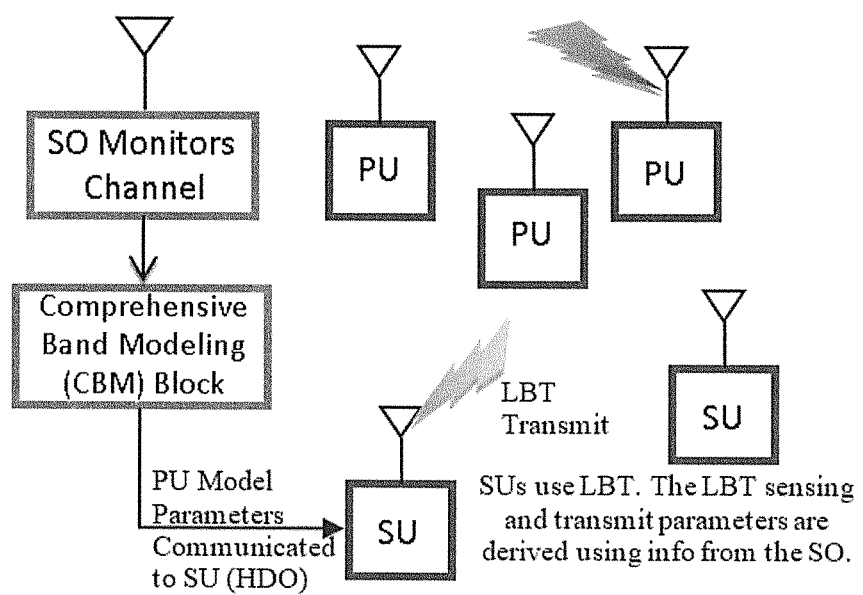
FIG. 27 illustrates how a spectrum observatory and a CBM analysis block can be incorporated in a DSA setup to support a network of SU radios according to one embodiment of this invention.

FIG. 27 illustrates how a spectrum observatory and a CBM analysis block can be incorporated in a DSA setup to support a network of SU radios. The SO measures incumbent user activity. The measurements are continually analyzed by the CBM block. The CBM outputs, i.e., the hole-descriptor objects characterizing the spectrum opportunities in the radio environment, are communicated to SU radios using a control channel. The SU radios thus are able to select their channel centers and transmission parameters, and dynamically share the spectrum with the PUs using any efficient DSA paradigm. In addition, this DSA network setup presents a practical application for spectrum observatory systems. It also demonstrates how the method of this invention can enhance dynamic spectrum sharing and make DSA practically feasible.

Current U.S. spectrum use is divided into a three-tiered authorization framework. Spectrum "owners" are granted exclusive rights to the spectrum. Priority access is given to secondary users, who register to obtain short-term priority operating rights. Third tier uses are non-guaranteed general access users. As discussed above, the method and system of this invention allow for improved spectrum sharing, and can be used to identify and quantify secondary and/or tertiary users. The method can further be used to assist the third tier users by identifying and allocating unused spectrum to the users.

The method and system of this invention provide a further advantage of providing for efficient multi-tiered spectrum sharing, beyond the typical three-tiers. In embodiments of this invention, a plurality of users can be prioritized in a plurality of predetermined tiers, i.e., an N-tiered spectrum authorization framework. In embodiments of the invention, potential spectrum uses are prioritized into the necessary number of N-tiers, and unused portions can be ranked and matched according to the prioritization and/or the needs of any higher priority users at any given time. As one example, emergency service providers can be a higher priority spectrum user as compared to other general spectrum users, but may only need the spectrum during emergencies. During non-emergency time, the unused spectrum can be automatically allocated to other lower priority users depending on need and/or prioritization. As needed, the spectrum can automatically be reallocated to the higher priority user, and desirably a different portion of the unused spectrum can be allocated to the lower priority user.

Thus the invention provides a method and system for spectrum sharing efficiency, by analysing spectrum measurement data for an entire band, identifying the signals and white spaces within the band, selecting the ideal channels for SU operation, modelling the primary's activities within a channel, and/or finally wrapping all this information in a compact object format. The CBM procedure has fast execution times—a standard desktop computer is able to process all the data in an entire band over 24 hours within a few minutes (<10 mins), allowing automated, real-time allocation and reallocation of spectrum portions to potential users upon receiving spectrum requests and/or user prioritization.

It will be appreciated that details of the foregoing embodiments, given for purposes of illustration, are not to be construed as limiting the scope of this invention. Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention, which is defined in the following claims and all equivalents thereto. Further, it is recognized that many embodiments may be conceived that do not achieve all of the advantages of some embodiments, particularly of the preferred embodiments, yet the absence of a particular advantage shall not be construed to necessarily mean that such an embodiment is outside the scope of the present invention.

What is claimed is:

1. A method of determining and/or sharing spectrum availability, the method comprising;
    automatically sensing and analyzing a spectrum to identify used and/or unused portions of the spectrum;
    automatically determining signals and holes within the spectrum;

automatically ranking the holes as a function of available bandwidth and/or incumbent duty cycles; and
automatically modeling spectrum that is infrequently used for incumbent transmissions; and
automatically communicating the used and/or unused portions of the spectrum to a spectrum owner or spectrum user based on the modeling.

2. The method of claim 1, further comprising automatically identifying current spectrum users and automatically reporting the current spectrum users to a spectrum owner.

3. The method of claim 1, wherein the sensing comprises automatically and repeatedly measuring the spectrum at a predetermined time interval.

4. The method of claim 3, wherein the sensing is performed by a spectrum power sensor connected to an antenna.

5. A method of determining and/or sharing spectrum availability, the method comprising:
automatically sensing and analyzing a spectrum to identify used and/or unused portions of the spectrum;
ranking unused portions of the spectrum;
prioritizing potential users for the spectrum;
automatically matching the ranked unused portions of the spectrum to the potential users as a function of the prioritizing; and
automatically communicating the used and/or unused portions of the spectrum to the potential users based on the matching.

6. The method of claim 5, further comprising:
automatically determining signals and holes within the spectrum;
automatically ranking the holes as a function of available bandwidth and/or incumbent duty cycles; and
automatically modeling spectrum that is infrequently used for incumbent transmissions.

7. A method of determining and/or sharing spectrum availability, the method comprising:
automatically sensing and analyzing a spectrum to identify used and/or unused portions of the spectrum,
automatically modeling measured spectrum data in a two-dimensional matrix, wherein each value within the matrix is a power measurement,
plotting the matrix via a spectrogram, and
automatically communicating the used and/or unused portions of the spectrum to a spectrum owner or a spectrum user based on the modeling.

8. The method of claim 7, further comprising:
automatically estimating a noise floor for the spectrum, wherein the noise floor is estimated band by band across the spectrum;
extracting clusters of each of detected signals and spectrum holes within the matrix;
identifying the signals and spectrum holes in the spectrum by extracting start and stop frequencies and bandwidths for each of the signals and spectrum holes; and
associating each start frequency with a corresponding stop frequency for the each of the signals and spectrum holes.

9. A method of determining and/or sharing spectrum availability, the method comprising:
automatically sensing and analyzing a spectrum to identify used and/or unused portions of the spectrum;
extracting all signals and spectrum holes measurement data of the spectrum;
quantifying a spectrum opportunity for at least one of the spectrum holes;
identifying a center frequency for the at least one of the spectrum holes; and
communicating the center frequency to a spectrum owner or a spectrum user.

10. A method of determining and/or sharing spectrum availability, the method comprising:
automatically scanning a spectrum to identify unused portions of the spectrum;
automatically ranking the unused portions of the spectrum;
prioritizing potential users for the spectrum;
automatically matching the ranked unused portions of the spectrum to the potential users as a function of the prioritizing; and
automatically communicating the unused portions of the spectrum to the potential users for the spectrum based on the matching.

11. The method of claim 10, further comprising receiving spectrum requests from the potential users and automatically allocating the unused portions to at least one of the potential users as a function of the spectrum requests.

12. The method of claim 10, further comprising subdividing the unused portions of the spectrum into a plurality of sub-channels each for one of the potential users.

13. The method of claim 10, wherein any unused portion of the spectrum is identified as a hole in the spectrum, and further comprising:
automatically analyzing the spectrum to identify hole information; and
automatically communicating the hole information to at least one of the potential users.

14. The method of claim 13, further comprising automatically communicating the unused portions of the spectrum to a network of smart radios, wherein the smart radios select channel transmission parameters from the hole information.

15. The method of claim 13, wherein the hole information comprises a hole center frequency, a hole bandwidth, a vector of average power spectrum densities across frequency points in the hole, a vector containing a histogram of average power spectrum densities observed in the hole over time, a vector storing a calculated spectrum opportunity fraction versus secondary user bandwidth for the hole, or combinations thereof.

16. The method of claim 10, further comprising prioritizing the potential users in an N-tiered hierarchical ranking.

17. The method of claim 16, further comprising assigning a portion of the spectrum being used by a lower priority spectrum user to a higher priority spectrum user.

18. The method of claim 17, further comprising determining a different portion of the spectrum for the lower priority spectrum user and moving the lower priority user to the different portion.

19. A method of determining and/or sharing spectrum availability, wherein any unused portion of a spectrum is identified as a hole in the spectrum, the method comprising:
automatically analyzing the spectrum to identify hole information; and
automatically communicating the hole information of the spectrum to potential users for the spectrum;
wherein the hole information comprises a combination of a hole center frequency, a hole bandwidth, a vector of average power spectrum densities across frequency points in the hole, a vector containing a histogram of average power spectrum densities observed in the hole over time, and a vector storing a calculated spectrum opportunity fraction versus secondary user bandwidth for the hole.

20. The method of claim 19, further comprising:
automatically ranking unused portions of the spectrum;
prioritizing the potential users for the spectrum; and
automatically matching the ranked unused portions of the spectrum to the potential users as a function of the prioritizing.

21. The method of claim 20, further comprising automatically communicating the unused portions of the spectrum to a transmission controller of a selected user of the prioritized potential users.

* * * * *